US010916083B2

(12) United States Patent
Murata et al.

(10) Patent No.: US 10,916,083 B2
(45) Date of Patent: Feb. 9, 2021

(54) VEHICLE EXIT MANAGEMENT SYSTEM AND GATE TERMINAL

(71) Applicant: TOYOTA JIDOSHA KABUSHIKI KAISHA, Toyota (JP)

(72) Inventors: Kenichi Murata, Miyoshi (JP); Yasuyuki Tamane, Miyoshi (JP); Masato Endo, Nagakute (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 19 days.

(21) Appl. No.: 15/550,201

(22) PCT Filed: Dec. 5, 2016

(86) PCT No.: PCT/JP2016/086098
§ 371 (c)(1),
(2) Date: Aug. 10, 2017

(87) PCT Pub. No.: WO2017/104470
PCT Pub. Date: Jun. 22, 2017

(65) Prior Publication Data
US 2018/0276919 A1 Sep. 27, 2018

(30) Foreign Application Priority Data
Dec. 18, 2015 (JP) .................... 2015-247957

(51) Int. Cl.
*G07C 9/02* (2006.01)
*G07C 9/28* (2020.01)
(Continued)

(52) U.S. Cl.
CPC .............. *G07C 9/28* (2020.01); *G06Q 50/10* (2013.01); *G07B 15/00* (2013.01); *G07C 9/257* (2020.01); *G08G 1/14* (2013.01)

(58) Field of Classification Search
CPC ........ G08G 1/065; G08G 1/146; G08G 1/149; G07C 9/00; G07C 9/00103–00134;
(Continued)

(56) References Cited

U.S. PATENT DOCUMENTS 9,443,427 B1 * 9/2016 Bhuiya .................. G06Q 10/02
2002/0116235 A1 * 8/2002 Grimm .................. G06Q 10/02
705/5
(Continued)

FOREIGN PATENT DOCUMENTS

CA 2805681 A1 8/2013
CN 104851136 A 8/2015
(Continued)

OTHER PUBLICATIONS

Kiani, Mansoor, Jafar Sayareh, and Saeid Nooramin. "A simulation framework for optimizing truck congestions in marine terminals." Journal of Maritime Research 7.1 (2010): 55-70. (Year: 2010).*
(Continued)

*Primary Examiner* — Scott M Tungate
(74) *Attorney, Agent, or Firm* — Oliff PLC

(57) ABSTRACT

Exit-possible exit gates are managed for each of vehicles that exit a parking lot. A vehicle exit management system 100 includes a gate terminal 161 controlling an exit gate of the parking lot; a DCM 141; and a vehicle management server 110 connected with the DCM 141 via a network 170. The DCM 141 transmits priority information acquired from the vehicle management server 110 based on a user ID of a vehicle 130 to the gate terminal 161 at a time of vehicle exit; and the gate terminal 161 opens the exit gate in the case of the received priority information satisfying the conditions.

4 Claims, 19 Drawing Sheets

(51) Int. Cl.
*G06Q 50/10* (2012.01)
*G07B 15/00* (2011.01)
*G07C 9/25* (2020.01)
*G08G 1/14* (2006.01)

(58) Field of Classification Search
CPC .. G07C 9/00166; G07C 9/10–38; G07C 9/20; G06Q 50/10; G07B 15/00
See application file for complete search history.

(56) References Cited

U.S. PATENT DOCUMENTS

| | | |
|---|---|---|
| 2004/0172316 A1 | 9/2004 | Hale et al. |
| 2009/0187341 A1* | 7/2009 | Vavrus ................. G01C 21/20 |
| | | 701/414 |
| 2009/0271102 A1 | 10/2009 | Inoguchi et al. |
| 2012/0092190 A1 | 4/2012 | Stefik et al. |
| 2012/0284209 A1* | 11/2012 | Duffy ..................... G07B 15/02 |
| | | 705/418 |

FOREIGN PATENT DOCUMENTS

| | | |
|---|---|---|
| EP | 2711881 A2 | 3/2014 |
| EP | 2720206 A1 | 4/2014 |
| JP | 2001-101461 A | 4/2001 |
| JP | 2007-509396 A | 4/2007 |
| JP | 2007-305026 A | 11/2007 |
| JP | 2008-186083 A | 8/2008 |
| WO | 2004/070674 A2 | 8/2004 |
| WO | 2005/038595 A2 | 4/2005 |

OTHER PUBLICATIONS

Clarivate Analytics, Thomson Scientific, London, Oct. 2015.

* cited by examiner

| VEHICLE INFORMATION ||||| |
|---|---|---|---|---|---|
| VEHICLE ID | LICENSE PLATE | VEHICLE TYPE | DCM TYPE | VEHICLE FOR DISABLED | |
| C1 | ... | α α | H | — | 4a |
| C2 | ... | β β | L | — | |
| C3 | ... | γ γ | — | ○ | |

410

| COUPON USE HISTORY INFORMATION |||||| |
|---|---|---|---|---|---|---|
| USER ID | COUPON SOURCE | NUMBER OF USED COUPONS | USED DATE AND TIME | PRIORITY INFORMATION | NUMBER OF REMAINING COUPONS | |
| U101 | TRAVEL AGENCY SERVER | 2 | 2015.9.15 | A | 0 | 4b |
| U203 | CREDIT COMPANY SERVER | 3 | 2015.9.15 | AA | 1 | |
| U301 | THEME PARK COMPANY SERVER | 2 | 2015.9.15 | A | 0 | |

FIG.5

COUPON INFORMATION (TRAVEL AGENCY) — 510 / 5a

| USER ID | USER ATTRIBUTE ||||  NUMBER OF COUPONS | COUPON ISSUANCE REASON |
|---|---|---|---|---|---|---|
| | NAME | SEX | AGE | ADDRESS | | |
| U101 | DD | F | 40 | ... | 2 | REQUEST WAS MADE CONCERNING CERTAIN PACKAGE ORGANIZED BY TRAVEL AGENCY |
| U102 | EE | M | 35 | ... | 0 | — |
| U103 | FF | F | 30 | ... | 0 | — |

COUPON INFORMATION (CREDIT COMPANY) — 520 / 5b

| USER ID | USER ATTRIBUTE ||||  NUMBER OF COUPONS | COUPON ISSUANCE REASON |
|---|---|---|---|---|---|---|
| | NAME | SEX | AGE | ADDRESS | | |
| U201 | GG | M | 35 | ... | 4 | FOUR COUPONS ARE ISSUED ANNUALLY BECAUSE USER IS PLATINUM MEMBER |
| U202 | HH | F | 45 | ... | 0 | — |
| U203 | II | M | 55 | ... | 0 | — |

COUPON INFORMATION (THEME PARK COMPANY) — 530 / 5c

| USER ID | USER ATTRIBUTE ||||  NUMBER OF COUPONS | COUPON ISSUANCE REASON |
|---|---|---|---|---|---|---|
| | NAME | SEX | AGE | ADDRESS | | |
| U301 | JJ | F | 25 | ... | 2 | USER BOUGHT ANNUAL PASSPORT |
| U302 | KK | M | 29 | ... | 0 | — |
| U303 | LL | F | 33 | ... | 0 | — |

GATE INFORMATION (GATE ID=G01)

| GATE NAME | GATE POSITION | CONDITIONS | CONDITION USE TIME ZONE |
|---|---|---|---|
| FIRST EASTERN GATE | LATITUDE___ LONGITUDE___ | AA, A, B, C | ALL TIME RANGES |

620

GATE INFORMATION (GATE ID=G02)

| GATE NAME | GATE POSITION | CONDITIONS | CONDITION USE TIME RANGE |
|---|---|---|---|
| SECOND EASTERN GATE | LATITUDE___ LONGITUDE___ | AA, A | 18:00~22:00 |

630

GATE INFORMATION (GATE ID=G03)

| GATE NAME | GATE POSITION | CONDITIONS | CONDITION USE TIME RANGE |
|---|---|---|---|
| WESTERN GATE | LATITUDE___ LONGITUDE___ | AA | 18:00~22:00 |

| PRIORITY INFORMATION (USER ID=U203) |
|---|
| AA |

14b

| EXIT-POSSIBLE VEHICLE INFORMATION ||||||
|---|---|---|---|---|
| GATE ID | GATE NAME | GATE POSITION | CONDITIONS | EXIT-POSSIBLE VEHICLE (VEHICLE ID OR USER ID) |
| G01 | FIRST EASTERN GATE | NORTH LATITUDE —— WEST LONGITUDE | AA, A, B, C | C1, C2, U101, U102, U103, U201, U202, U203, U301, U302, U303, ··· |
| G02 | SECOND EASTERN GATE | NORTH LATITUDE —— WEST LONGITUDE | AA, A | C1, U203, U101, U301, ··· |
| G03 | WESTERN GATE | NORTH LATITUDE —— WEST LONGITUDE | AA | U203, ··· |

14c

| EXIT-POSSIBLE GATE INFORMATION (USER ID=U203) ||
|---|---|
| GATE NAME | GATE POSITION |
| FIRST EASTERN GATE | NORTH LATITUDE—— WEST LONGITUDE—— |
| SECOND EASTERN GATE | NORTH LATITUDE—— WEST LONGITUDE—— |
| WESTERN GATE | NORTH LATITUDE—— WEST LONGITUDE—— |

VEHICLE EXIT MANAGEMENT SYSTEM AND GATE TERMINAL

TECHNICAL FIELD

The present invention relates to a vehicle exit management system and a gate terminal.

BACKGROUND ART

In the past, congestion occurs in an exit route toward an exit gate if vehicles are exiting a parking lot, near a large-scale commercial facility or an event site, together in a certain time range. As a result, a considerable time may be required for a vehicle to exit the parking lot.

In this regard, a vehicle guidance apparatus which searches for an appropriate exit route in a parking lot having a plurality of exit routes, and sends the search result to an occupant of a vehicle for guidance is known (for example, see Patent Reference No. 1 shown below). By using the vehicle guidance apparatus, it is possible to go toward an exit gate through an exit route with less severe congestion, and it is possible to reduce a time required for exiting the parking lot.

PRIOR ART REFERENCE

Patent Reference

Patent Reference No. 1: Japanese Laid-Open Patent Application No. 2007-305026

SUMMARY OF THE INVENTION

Problem to be Solved by the Invention

However, in a situation where all exit routes toward an exit gate have congestion, there is a limit to reducing the time required to exit a parking lot. Also, in such a situation, even for a vehicle having the above-mentioned apparatus, a time similar to a time required for another vehicle is required to exit the parking lot.

In contrast thereto, by managing exit-possible exit gates for each vehicle to allow only a certain vehicle to exit through a certain exit gate, it is possible to reduce the time required to exit a parking lot for the certain vehicle.

Therefore, an object of the present disclosure is to provide a vehicle exit management system and a gate terminal with which exit-possible exit gates are managed for each vehicle that exits a parking lot.

Means to Solve the Problem

According to one aspect of the present disclosure, a vehicle exit management system includes:
 a plurality of gate terminals configured to control respective exit gates of a parking lot;
 a communications apparatus configured to, in the case of the communications apparatus being in an area near any one of the exit gates, carry out communications with the corresponding gate terminal; and
 a server apparatus connected with the communications apparatus via a network.
 The communications apparatus includes:
 an identification information acquisition means configured to acquire identification information identifying a vehicle or an occupant of the vehicle,
 a priority information acquisition means configured to acquire priority information determined with the use of information that is stored in the server apparatus in a state of being associated with the identification information, the priority information indicating a priority with respect to another vehicle to be used when the vehicle that has therein the occupant exits through any one of the exit gates, and
 a transmission means configured to, in the case of the communications apparatus being in an area near any one of the exit gates, transmit the priority information acquired by the priority information acquisition means to the corresponding gate terminal.
 Each of the gate terminals includes:
 a condition setting means configured to set conditions for the vehicle to exit through the exit gate,
 a reception means configured to receive the priority information transmitted by the transmission means, and
 a control means configured to control the exit gate to open the exit gate in the case of the priority information received by the reception means satisfying the conditions that are set by the condition setting means.

According to the vehicle exit management system, the identification information acquisition means acquires identification information identifying a vehicle or an occupant of the vehicle. The priority information acquisition means acquires priority information determined with the use of information that is stored in the server apparatus in a state of being associated with the identification information, the priority information indicating a priority with respect to another vehicle to be used when the vehicle that has therein the occupant exits through any one of the exit gates. Then, in the case of the communications apparatus being in an area near any one of the exit gates, the transmission means transmits the priority information acquired by the priority information acquisition means to the corresponding gate terminal.

Thereby, it is possible for the communications apparatus to acquire the priority information associated with a vehicle or an occupant of the vehicle via a network. Then, in the case of the vehicle having the communications apparatus (or the vehicle that has therein the occupant having the communications apparatus) being in an area near an exit gate, the communications apparatus can transmit the acquired priority information to a gate terminal.

Also, in the vehicle exit management system, the condition setting means sets conditions for the vehicle to exit through the exit gate, and, in the case of the priority information satisfying the conditions that are set by the condition setting means, the control means controls the exit gate to open the exit gate Thereby, the exit gate is controlled according to the priority information acquired by the communications apparatus, and thus, it is possible to manage exit-possible exit gates for each vehicle.

Advantageous Effects of the Invention

According to the present disclosure, it is possible to provide a vehicle exit management system and a gate terminal managing exit-possible exit gates for each vehicle exiting a parking lot.

BRIEF DESCRIPTION OF DRAWINGS

FIG. 4 illustrates examples of vehicle information and coupon use history information.

FIG. 5 illustrates one example of coupon information.

FIG. 6 illustrates one example of gate information.

FIG. 14 illustrates examples of priority information, exit-possible vehicle information, and exit-possible gate information.

MODE FOR CARRYING OUT THE INVENTION

Figure 1:
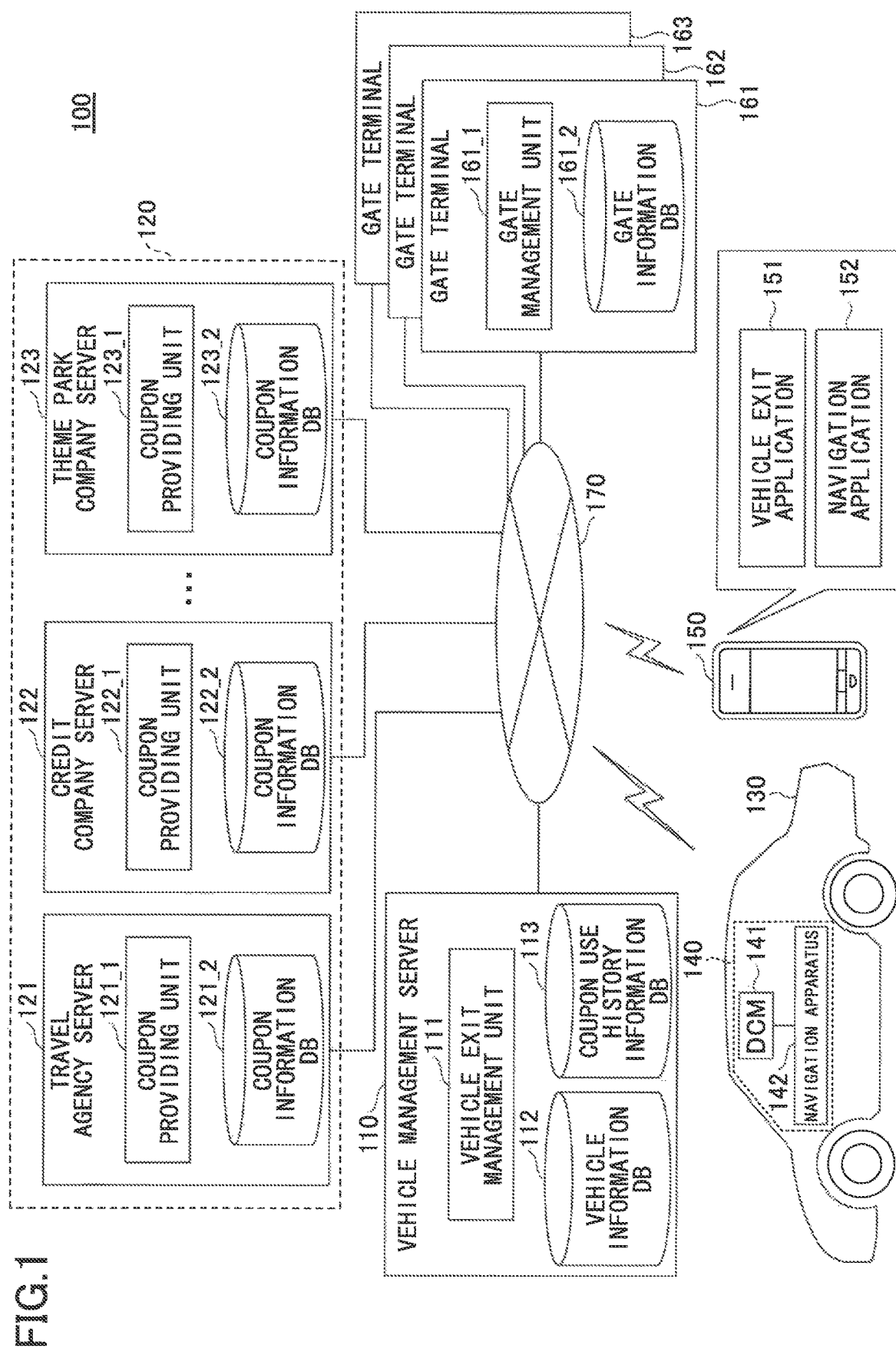
FIG. 1 illustrates a configuration example of a vehicle exit management system.

Below, respective embodiments of the present invention will be described with reference to the accompanying drawings. Note that, in the specification and the drawings, the same reference numerals are given to elements having substantially the same functional configurations, and duplicate description will be omitted.

First Embodiment

1. Configuration of Vehicle Exit Management System

First, a configuration of a vehicle exit management system according to a first embodiment will be described. FIG. 1 illustrates a configuration example of a vehicle exit management system. As illustrated in FIG. 1, the vehicle exit management system 100 includes a vehicle management server 110, a travel agency server 121, a credit company server 122, a theme park company server 123, a vehicle communications apparatus 140, a portable terminal 150, and gate terminals 161-163.

Note that, the travel agency server 121, the credit company server 122, and the theme park company server 123 are servers of service companies that provide various services. Hereinafter, any or all of servers of service companies such as these service companies will be referred to as a server 120 or servers 120.

In the vehicle exit management system 100, the vehicle management server 110 and the servers 120 are communicably connected via a network 170. Also, the vehicle management server 110 and a DCM (Data Communication Module) 141 of a vehicle 130 are communicably connected via the network 170, and the vehicle management server 110 and the portable terminal 150 are communicably connected via the network 170. Also, the DCM 141, the portable terminal 150, and the servers 120 are communicably connected via the network 170. Further, also the vehicle management server 110 and the gate terminals 161-163 are communicably connected via the network 170.

The vehicle management server 110 is a server apparatus that manages the vehicle 130. According to the present embodiment, a vehicle exit management program is installed in the vehicle management server 110. The vehicle management server 110 functions as a vehicle exit management unit 111 by executing the program.

The vehicle exit management unit 111 identifies the vehicle 130 or an occupant who is in the vehicle 130 based on information included in an exit request after receiving the exit request (information to request to exit a parking lot) from the vehicle 130. More specifically, the vehicle exit management unit 111 extracts information (for example, a vehicle ID) for identifying the vehicle 130 or information (for example, a user ID) for identifying the occupant who is in the vehicle 130, as "identification information", from the exit request.

Note that the exit request received from the vehicle 130 can be one of an exit request received from the DCM 141 that is set in the vehicle 130 and an exit request from the portable terminal 150 owned by the occupant who is in the vehicle 130.

The exit request received from the DCM 141 includes, as identification information, only a vehicle ID in one case, and includes both a vehicle ID and a user ID in another case. The exit request received from the portable terminal 150 includes, as identification information, only a user ID.

After identifying the vehicle 130, the vehicle exit management unit 111 reads a vehicle information DB 112 to determine priority information that indicates a priority with respect to another vehicle to be used when the vehicle 130 exits a parking lot through an exit gate. Also, after identifying an occupant who is in the vehicle 130, the vehicle exit management unit 111 acquires coupons having been issued as a result of the identified occupant using a service provided by a server 120. Further, the vehicle exit management unit 111 modifies the priority information based on the coupons acquired from the server 120 to determine the modified priority information as priority information to be transmitted to the vehicle 130. Note that, if the vehicle exit management unit 111 thus has used coupons to determine priority information, the vehicle exit management unit 111 records a coupon use history in a coupon use history information DB 113.

Further, the vehicle exit management unit 111 identifies a parking lot corresponding to the current position of the vehicle 130 based on position information included in the exit request received from the vehicle 130. Also, the vehicle exit management unit 111 acquires, from gate terminals (in this case, the gate terminals 161-163) that control respective exit gates of the identified parking lot, conditions for the vehicle 130 to exit through each of the exit gates.

The vehicle exit management unit 111 determines an exit gate through which the vehicle 130 can exit, based on the determined priority information and the acquired conditions. Also, the vehicle exit management unit 111 transmits exit-possible gate information including a gate name and a gate position of the exit gate thus determined for the vehicle 130 to be able to exit, and the determined priority information, to the vehicle 130. Note that, if the vehicle exit management unit 111 has received the exit request from the DCM 141, the vehicle exit management unit 111 transmits the exit-possible gate information and the priority information to the DCM 141. If the vehicle exit management unit 111 has received the exit request from the portable terminal 150, the vehicle exit management unit 111 transmits the exit-possible gate information and the priority information to the portable terminal 150.

The servers 120 manage users who use various services provided by the respective service companies, and manage coupons having been issued as a result of users using various services. In the servers 120, respective coupon providing programs are installed. As a result of the servers 120 executing the coupon providing programs, the servers 120 function as coupon providing units (121_1-123_1), respectively.

After receiving requests for coupons from the vehicle management server 110, the coupon providing units (121_1-123_1) read coupon information DBs (121_2-123_2) based on user IDs included in the requests. Also, the coupon providing units (121_1-123_1) retrieve the numbers of coupons, the numbers being managed in a state of being associated with user IDs to transmit the coupons to the vehicle management server 110.

The vehicle communications apparatus 140 is set in the vehicle 130 and includes the DCM 141 and a navigation apparatus 142. The DCM 141 transmits an exit request to the vehicle management server 110 via the network 170 to receive priority information and exit-possible gate information from the vehicle management server 110, and sends the priority information and the exit-possible gate information to the navigation apparatus 142.

If the DCM 141 has entered any one of certain areas near the exit gates controlled by the respective gate terminals 161-163, the DCM 141 carries out communications with the corresponding gate terminal 161, 162, or 163 to transmit priority information to the corresponding gate terminal 161, 162, or 163.

The navigation apparatus 142 receives, from the occupant of the vehicle 130, information for the DCM 141 to send an exit request. Also, the navigation apparatus 142 acquires position information indicating the current position. The navigation apparatus 142 sends these items of information to the DCM 141 to receive, from the DCM, priority information and exit-possible gate information acquired as a result of the DCM 141 sending an exit request with the use of these items of information. The navigation apparatus 142 displays the priority information and the exit-possible gate information. Thus, at a time of exiting through an exit gate of a parking lot, the occupant of the vehicle 130 can see the currently available priority information and an exit gate through which the vehicle 130 can exit.

Also, the navigation apparatus 142 searches for a route up to a destination that is set by the occupant of the vehicle 130 from the current position. Note that, the navigation apparatus 142 can automatically set the gate position included in the exit-possible gate information as a pass-by location to search for a route from the current position up to a destination. Alternatively, the navigation apparatus 142 can set one of the gate positions included in the exit-possible gate information as the destination to search for a route up to the exit gate.

The navigation apparatus 142 guides the vehicle 130 to the destination by carrying out route guidance according to the thus acquired route based on the acquired position information.

The portable terminal 150 is a communications apparatus that has a communications function and a position information acquisition function. An occupant who is in the vehicle 130 has the portable terminal 150. In the portable terminal 150, a vehicle exit application 151 and a navigation application 152 are installed.

The portable terminal 150 transmits an exit request to the vehicle management server 110 via the network 170 and receives priority information and exit-possible gate information from the vehicle management server 110, by executing the vehicle exit application 151. Also, the portable terminal 150 sends the received priority information and exit-possible gate information to the navigation application 152.

Also, when the portable terminal 150 has entered any one of the certain areas near the exit gates controlled by the respective gate terminals 161-163, the portable terminal 150 carries out communications with the corresponding one of the gate terminals 161-163 to transmit the priority information to the corresponding one of the gate terminals 161-163.

Also, by executing the navigation application 152, the portable terminal 150 receives information from the occupant of the vehicle 130 necessary to send an exit request. Also, the portable terminal 150 acquires position information that indicates the current position. Also, the portable terminal 150 sends these items of information to the vehicle exit application. Further, the portable terminal 150 receives priority information and exit-possible gate information from the vehicle exit application 151 acquired as a result of the vehicle exit application 151 sending an exit request using these items of information, and displays the priority information and the exit-possible gate information. Thus, at a time of exiting through an exit gate of a parking lot, the occupant of the vehicle 130 can see the currently available priority information and an exit gate through which the vehicle 130 can exit.

Also, the portable terminal 150 searches for a route up to a destination that is set by an occupant of the vehicle 130 from the current position by executing the navigation application 150. Note that, the portable terminal 150 can automatically set a gate position included in exit-possible gate information as a pass-by location to search for a route from the current position up to a destination. Alternatively, the portable terminal 150 can set one of the gate positions included in the exit-possible gate information as a destination to search for a route up to the exit gate.

Also, the portable terminal 150 guides the vehicle 130 to a destination by carrying out route guidance according to the thus acquired route based on the acquired position information by executing the navigation application 152.

The gate terminals 161-163 are terminals controlling a plurality of exit gates of a parking lot, respectively. In the gate terminal 161, a gate management program is installed. As a result of the gate terminal 161 executing the program, the gate terminal 161 functions as a gate management unit 161_1.

The gate management unit 161_1 sets conditions necessary for a vehicle to exit through the exit gate in a gate information DB 161_2. After receiving a request from the vehicle management server 110, the gate management unit 161_1 transmits the gate name, the gate position, and the conditions of the exit gate to the vehicle management server 110.

Note that, the gate terminals 162 and 163 have the same functions basically. However, among the respective sets of the conditions that are set to the gate terminals 161-163, the set of conditions that are set to at least one gate terminal are different from the sets of conditions that are set to the other gate terminals. By thus making the respective sets of conditions that are set to the gate terminals different thereamong, it is possible to make the numbers of exit-possible vehicles that can exit through the respective exit gates different thereamong. That is, it is possible to create an exit gate through which the number of exit-possible vehicles that can exit is smaller and create an exit gate through which the number of exit-possible vehicles that can exit is greater. Note that, according to the present embodiment, the respective sets of conditions that are set to the gate terminals 161-163 will be changed depending on time ranges.

Also, in a case where the DCM 141 or the portable terminal 150 enters any one of the certain areas near the exit gates controlled by the gate terminals 161-163, respectively, the corresponding gate terminal carries out communications with the DCM 141 or the portable terminal 150. The case where the DCM 141 enters the certain area near an exit gate is a case where the vehicle 130 that has the DCM 141 moves to the certain area near the exit gate. Also, the case where the portable terminal 150 enters the certain area near an exit gate is a case where the vehicle 130 that has therein the occupant who has the portable terminal 150 moves to the certain area near the exit gate.

A gate terminal 161, 162, or 163 receives priority information that the DCM 141 or the portable terminal 150 has by carrying out communications with the DCM 141 or the portable terminal 150. The gate terminal 161, 162, or 163 determines whether the received priority information satisfies the conditions that have been set. If the determination result is that the received priority information satisfies the conditions that have been set, the gate terminal 161, 162, or 163 controls the exit gate to open the exit gate. Thus, the vehicle 130 can exit through the exit gate.

2. Arrangement of Exit Gates in Parking Lot

Figure 2:
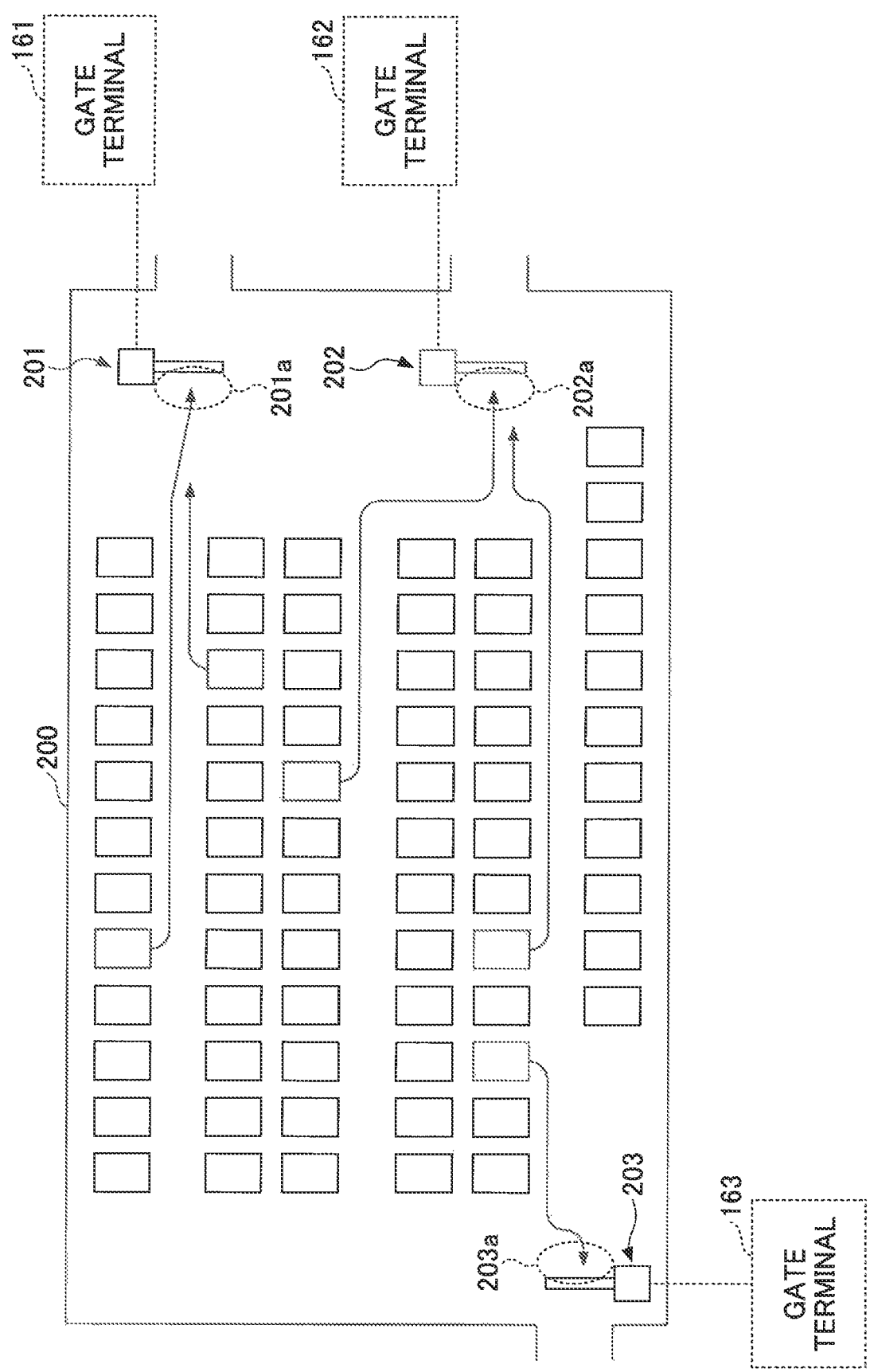
FIG. 2 illustrates an exit gate arrangement example in a parking lot.

Next, an arrangement of the exit gates in the parking lot adjacent to a large-scale commercial facility or an event site will be described. FIG. 2 illustrates an exit gate arrangement example in the parking lot. As illustrated in FIG. 2, in the parking lot 200 adjacent to a large-scale commercial facility of an event site, the plurality of exit gates are installed.

In the example of FIG. 2, in the parking lot 200, the exit gates 201-203 are installed. The gate terminals 161-163 are connected to and control the respective exit gates 201-203.

As a result of the DCM 141 or the portable terminal 150 entering the certain area 201a near the exit gate 201, the gate terminal 161 carries out communications with the DCM 141 or the portable terminal 150. In the same way, as a result of the DCM 141 or the portable terminal 150 entering the certain area 202a near the exit gate 202, the gate terminal 162 carries out communications with the DCM 141 or the portable terminal 150. In the same way, as a result of the DCM 141 or the portable terminal 150 entering the certain area 203a near the exit gate 203, the gate terminal 163 carries out communications with the DCM 141 or the portable terminal 150.

Note that, in FIG. 2, rectangles illustrated in the parking lot 200 represent vehicles that are parked in the parking lot 200. Also, arrows extending from rectangles toward the exit gates 201-203 represent examples of exit routes toward the exit gates for respective vehicles to exit the parking lot 200.

3. Hardware Configuration of Vehicle Management Server

Figure 3:
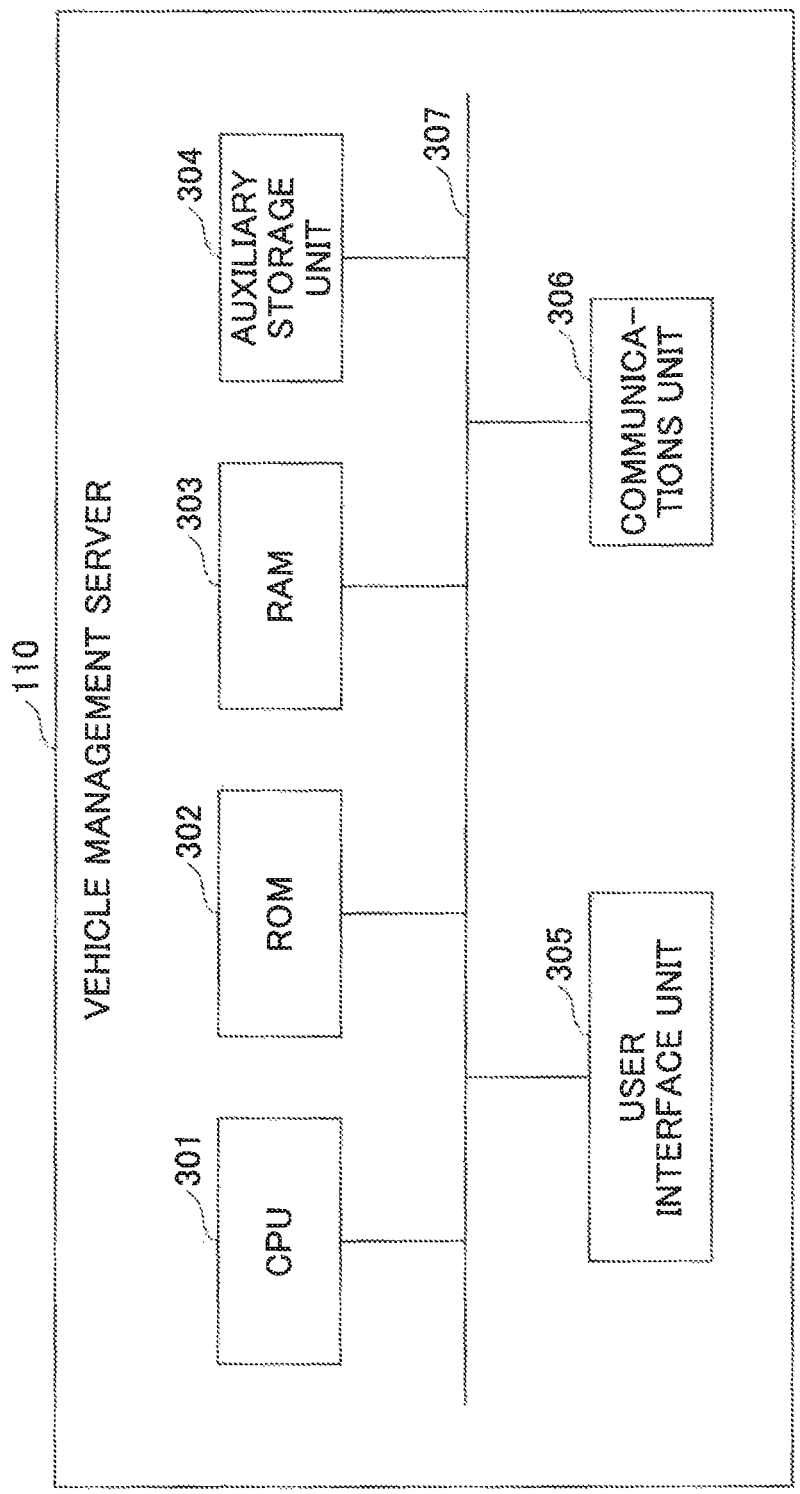
FIG. 3 illustrates one example of a hardware configuration of a vehicle management server.

Next, a hardware configuration of each apparatus included in the vehicle exit management system 100 will be described. Note that, each apparatus included in the vehicle exit management system 100 has approximately the same hardware configuration. Therefore, a hardware configuration of the vehicle management server will now be described. FIG. 3 illustrates one example of a hardware configuration of the vehicle management server.

As illustrated in FIG. 3, the vehicle management server 110 includes a CPU (Central Processing Unit) 301, a ROM (Read Only Memory) 302, a RAM (Random Access Memory) 303, an auxiliary storage unit 304, a user interface unit 305, and a communications unit 306. Note that, the respective units of the vehicle management server 110 are mutually connected via a bus 307.

The CPU 301 is a computer that uses the RAM 303 as a work area to execute programs (the vehicle exit management program, and so forth) stored in the ROM 302 and stored in the auxiliary storage unit 304.

The user interface unit 305 inputs information necessary for the CPU 301 to execute the programs, and outputs information generated as a result of the CPU 301 executing the programs.

The communications unit 306 is connected with the network 170 and carries out communications with the respective apparatuses via the network 170. Note that in a case of the DCM 141, the communications unit 306 has, in addition to the function of connecting with the network 170 to carry out communications with the respective apparatuses via the network 170, a function of carrying out communications with the gate terminals 161-163 in the certain areas 201a-203a.

Also, in a case of the portable terminal 150, the communications unit 306 has, in addition to the function of connecting with the network 170 to carry out communications and the function of carrying out communications with the gate terminals 161-163 in the certain areas 201a-203a, a function of receiving a signal from a GPS (Global Positioning System).

Additionally, in a case of the navigation apparatus 142, the communications unit 306 has the function of receiving a signal from a GPS (Global Positioning System).

4. Description of Vehicle Information and Coupon Use History Information

Next, vehicle information stored in the vehicle information DB 112 and coupon use history information stored in the coupon use history information DB 113 will be described. 4a of FIG. 4 illustrates one example of the vehicle information. As illustrated in 4a of FIG. 4, the vehicle information 400 includes, as information items, "vehicle ID (Identifier)", "license plate", "vehicle type", "DCM type", and "vehicle for disabled".

As "vehicle ID", unique identification information for each vehicle to identify the vehicle is stored. As "license plate", information of a license plate of the vehicle is stored.

As "vehicle type", information indicating a type of the vehicle is stored. As "DCM type", information for indicting a type of a DCM that is set in the vehicle is stored. As "vehicle for disabled", information indicating whether the vehicle is a vehicle for the disabled is stored.

According to the example of 4a of FIG. 4, a vehicle having a vehicle ID=C1 has a vehicle type=αα, and has a DCM having a DCM type=H. Also, according to the example of 4a of FIG. 4, a vehicle having a vehicle ID=C2 has a vehicle type=ββ, and has a DCM having a DCM type=L. According to the example of 4a of FIG. 4, a vehicle having a vehicle ID=C3 has a vehicle type=γγ, does not have a DCM, and is a vehicle for the disabled.

4b of FIG. 4 illustrates one example of the coupon use history information. As illustrated in 4b of FIG. 4, the coupon use history information 410 includes, as information items, "user ID", "coupon source", "number of used coupons", "used date and time", "priority information", and "number of remaining coupons".

As "user ID", a user ID included in an exit request from the DCM 141 or the portable terminal 150 is stored. As "coupon source", information indicating a server 120 which has transmitted coupons in response to a request from the vehicle management server 110 is stored.

As "number of used coupons", the number of coupons used when priority information is determined in response to an exit request from the DCM 141 or the portable terminal 150 is stored. As "used date and time", the date and time at which coupons are used for determining priority information in response to an exit request from the DCM 141 or the portable terminal 150 are stored.

As "priority information", priority information determined in response to an exit request from the DCM 141 or the portable terminal 150 is stored. As "number of remaining coupons", the number of remaining coupons left after some of coupons transmitted from a server 120 are used for determining prior information is stored.

By thus previously storing the coupon use history information 410, the vehicle management server 110 can read the coupon use history information 410 if an exit request that includes the same user ID as the user ID stored in the coupon use history information 410 has been received. Thus, the vehicle management server 110 can acquire the coupons corresponding to the user ID from the coupon use history information 410, and therefore, the vehicle management server 110 need not request the coupons from a server 120.

5. Description of Coupon Information

Next, coupon information stored in the coupon information DBs (121_2-123_2) of the servers 120 will be described using FIG. 5.

(1) Example of Coupon Information DB 121_2

5a of FIG. 5 illustrates one example of coupon information stored in the coupon information DB 121_2 of the travel agency server 121. As illustrated in 5a of FIG. 5, the coupon information 510 includes, as information items, "user ID", "user attribute", "number of coupons", and "coupon issuance reason".

As "user ID", identification information identifying a user who uses a service provided by a travel agency is stored. As "user attribute", information concerning an attribute of a user who uses a service provided by the travel agency is stored. "User attribute" includes "name", "sex", "age", and "address", and detailed information of user attributes is stored as "user attribute".

As "number of coupons", the number of coupons issued by the travel agency for each user is stored. As "coupon issuance reason", a coupon issuance reason is recorded. According to the example of 5a of FIG. 5, a user identified by a user ID=U101 has requested to purchase an event ticket concerning a certain package managed by the travel agency, whereby two coupons have been issued.

(2) Description of Coupon Information DB 122_2

5b of FIG. 5 illustrates one example of coupon information stored in the coupon information DB 1222 of the credit company server 122. As illustrated in 5b of FIG. 5, the coupon information 520 includes, as information items, "user ID", "user attribute", "number of coupons", and "coupon issuance reason". Note that information stored as the respective information items are basically the same as the information stored as the respective items of the coupon information 510, and therefore, the description will be omitted here.

According to the example of 5b of FIG. 5, a user identified by a user ID=U201 is a platinum member of a credit company, and therefore, four coupons are issued annually.

(3) Description of Coupon Information DB 122_3

5c of FIG. 5 illustrates one example of coupon information stored in the coupon information DB 123_2 of the theme park company server 123. As illustrated in 5c of FIG. 5, the coupon information 530 includes, as information items, "user ID", "user attribute", "number of coupons", and "coupon issuance reason". Note that information stored as the respective information items are basically the same as the information stored as the respective items of the coupon information 510, and therefore, the description will be omitted here.

According to the example of 5c of FIG. 5, a user identified by a user ID=U301 has purchased an annual passport for a theme park managed by a theme park company, and therefore, two coupons have been issued.

6. Description of Gate Information

Next, gate information stored in each of the gate information DBs (the gate information DBs 161_2, and so forth) of the gate terminals 161-163 will be described. FIG. 6 illustrates one example of the gate information. As illustrates in FIG. 6, the gate information is set for each gate terminal, and has, as information items, "gate name", "gate position", "conditions", and "condition use time range".

As "gate name", a name for identifying a gate is stored. As "gate position", information (latitude and longitude) for identifying a position of a gate is stored. As "conditions", conditions for allowing a vehicle to exit through the exit gate are set.

As "condition use time range", information concerning a time range during which the exit gate is controlled based on "conditions" is stored.

Note that, as "conditions" of at least one set of gate information from among the respective sets of gate information 610-630, conditions different from conditions that are set as "conditions" of other sets of gate information are set. Different conditions mean such conditions that the number of exit-possible vehicles that can exit through an exit gate will be smaller.

According to the example of FIG. 6, the conditions that are set as "conditions" of the respective sets of gate information 610-630 are different from each other. "AA" that is set as "conditions" of the gate information 630 is such that the number of exit-possible vehicles will be smaller than "AA, A" and "AA, A, B, C" that are set as "conditions" of the gate information 610 and the gate information 620. Also, "AA, A" that are set as "conditions" of the gate information 620 are such that the number of exit-possible vehicles will be smaller than "AA, A, B, C" that are set as "conditions" of the gate information 610.

Note that, conditions="AA" means that a vehicle that has a DCM having priority information "AA" or a vehicle that has therein an occupant who has a portable terminal having priority information "AA" is an exit-possible vehicle.

Conditions="AA, A" means that a vehicle that has a DCM having priority information "AA" or "A", or a vehicle that has therein an occupant who has a portable terminal having priority information "AA" or "A" is an exit-possible vehicle.

Further, conditions="AA, A, B, C" means that a vehicle that has a DCM having priority information of any one of "AA" through "C" or a vehicle that has therein an occupant who has a portable terminal having priority information of any one of "AA" through "C" is an exit-possible vehicle.

7. Functional Configurations of Respective Apparatuses

Next, functional configurations of the respective apparatuses (i.e., the vehicle management server 110, the vehicle communications apparatus 140 (the DCM 141 and the navigation apparatus 142), and the gate terminal 161) included in the vehicle exit management system 100 will be described.

(1) Functional Configuration of Vehicle Management Server

Figure 7:
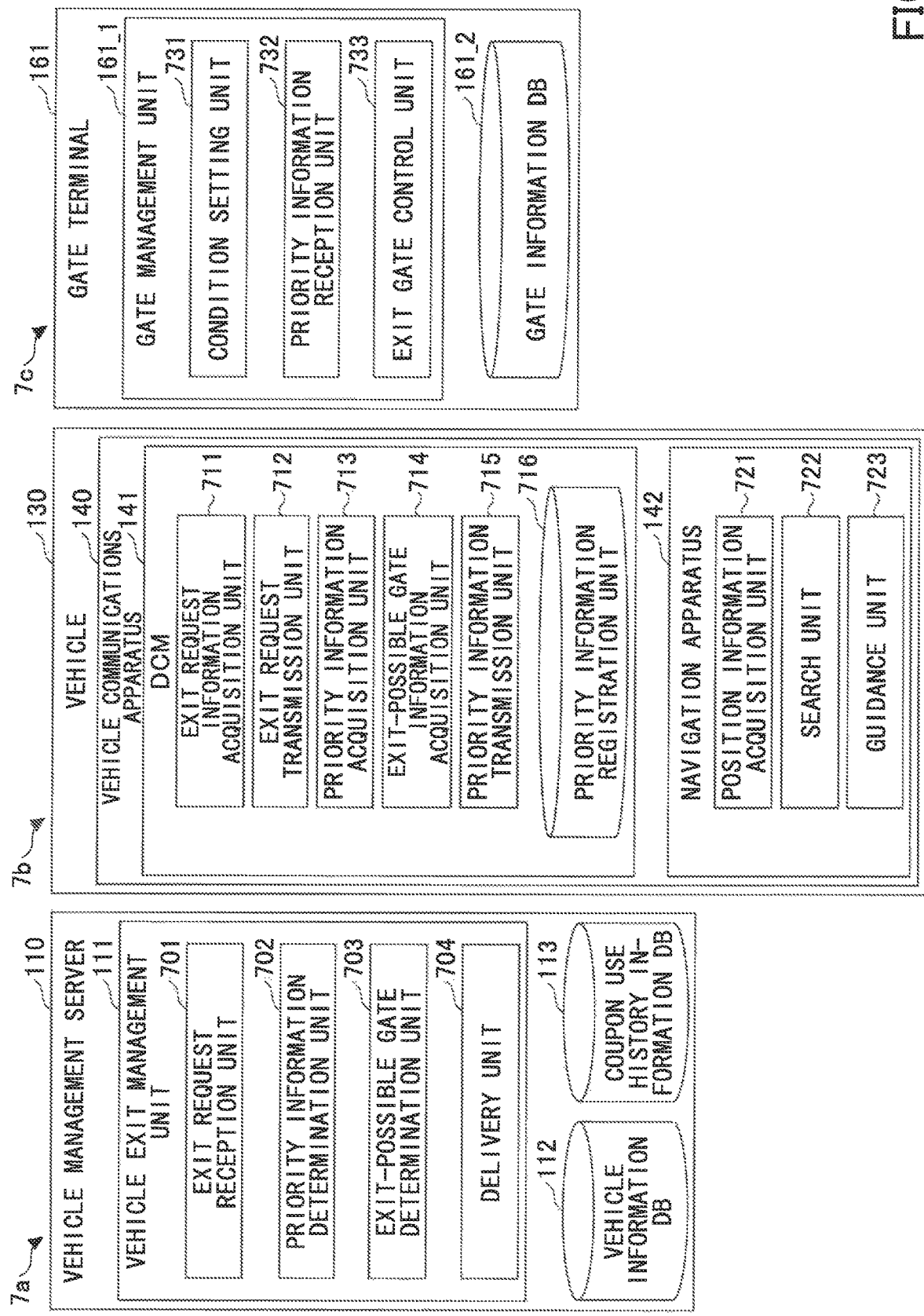
FIG. 7 illustrates examples of functional configurations of a vehicle management server, a vehicle, and a gate terminal.

First, a functional configuration of the vehicle exit management unit 111 of the vehicle management server 110 will be described. 7a of FIG. 7 illustrates one example of a functional configuration of the vehicle management server. As illustrated in 7a of FIG. 7, the vehicle exit management unit 111 of the vehicle management server 110 includes an exit request reception unit 701, a priority information determination unit 702, an exit-possible gate determination unit 703, and a delivery unit 704.

The exit request reception unit 701 receives an exit request transmitted from the vehicle 130. After receiving an exit request, the exit request reception unit 701 sends the exit request to the priority information determination unit 702.

The priority information determination unit 702 analyzes the exit request sent from the exit request reception unit 701 to extract identification information. More specifically, the priority information determination unit 702 extracts, as identification information included in the exit request, a user ID, for example. The priority information determination unit 702 acquires coupons from the server 120 corresponding to the extracted user ID (or acquires coupons from the coupon use history information 410 corresponding to the extracted user ID).

Also, the priority information determination unit 702 extracts, as identification information included in the exit request sent from the request reception unit 701, a vehicle ID, for example. Also, the priority information determination unit 702 reads the vehicle information 400 to determine priority information indicating a priority with respect to another vehicle to be used when the vehicle 130 exits a parking lot.

Further, the priority information determination unit 702 modifies the determined priority information based on the acquired coupons to determine the modified priority information as priority information to be transmitted to the DCM 141 or the portable terminal 150. Thus, the priority information determination unit 702 functions as a determination unit to determine priority information.

Note that, if the exit request does not include a user ID, the priority information determination unit 702 determines, as priority information to be transmitted to the DCM 141, priority information that has been determined from reading the vehicle information 400 based on the vehicle ID. If the exit request does not include a vehicle ID, the priority information determination unit 702 determines, as priority information to be transmitted to the portable terminal 150, priority information acquired from modifying predetermined priority information based on the acquired coupons.

The case where the exit request does not include a user ID is a case where, for example, an occupant sends the exit request through the DCM 141 in a case where, for example, the occupant has no coupons or does not wish to use coupons.

The case where the exit request does not include a vehicle ID is a case where, for example, an occupant sends the exit request through the portable terminal 150.

The priority information determination unit 702 sends the determined priority information to the exit-possible gate determination unit 703. Further, the priority information determination unit 702 includes position information, included in the exit request, in a gate information request, and sends the gate information request to the exit-possible gate determination unit 703.

The exit-possible gate determination unit 703 is one example of a determination means, and determines exit gates through which the vehicle 130 can exit.

More specifically, the exit-possible gate determination unit 703 determines the current position of the vehicle 130 based on the position information included in the gate information request sent from the priority information determination unit 702. Also, the exit-possible gate determination unit 703 determines the parking lot 200 where the vehicle 130 has been currently parked based on the determined current position, and determines the gate terminals 161-163 that controls the exit gates of the determined parking lot 200. Thus, the exit-possible gate determination unit 703 can determine transmission destinations to which the gate information request is to be transmitted.

By transmitting the gate information request to the determined transmission destinations, the exit-possible gate determination unit 703 acquires, from the gate terminals 161-163 that are the transmission destinations, sets of gate information 610-630 concerning the exit gates controlled by the respective gate terminals 161-163.

As a result, the exit-possible gate determination unit 703 can compare "conditions" (the conditions that have been currently set) included in the acquired sets of gate information 610-630 with the priority information sent from the priority information determination unit 702. Also, the exit-possible gate determination unit 703 can determine exit gates through which the vehicle 130 can exit, based on the comparison result.

The exit-possible gate determination unit 703 sends exit-possible gate information including the gate names and gate positions of the exit-possible exit gates, and the priority information, to the delivery unit 704.

The delivery unit 704 is one example of a delivery means, and determines the transmission source of the exit request as the delivery destination of the priority information and the exit-possible gate information. If the determination result is that the exit request has been transmitted from the DCM 141 that is set in the vehicle 130, the delivery unit 704 delivers the priority information and the exit-possible gate information to the DCM 141. If the determination result is that the exit request has been transmitted from the portable terminal 150 owned by the occupant who is in the vehicle 130, the delivery unit 704 delivers the priority information and the exit-possible gate information to the portable terminal 150.

After the completion of the delivery, the delivery unit 704 sends information indicating that delivery of priority information has been completed to the priority information determination unit 702. Thus, the priority information determination unit 702 updates the coupon use history information 410 stored in the coupon use history information DB 113.

(2) Functional Configuration of Vehicle Communications Apparatus (DCM and Navigation Apparatus)

Next, a functional configuration of the vehicle communications apparatus 140 (the DCM 141 and the navigation apparatus 142) will be described. 7b of FIG. 7 illustrates one example of a functional configuration of the vehicle communications apparatus 140 (the DCM 141 and the navigation apparatus 142). As illustrated in 7b of FIG. 7, in the vehicle communications apparatus 140, the DCM 141 includes an exit request information acquisition unit 711, an exit request transmission unit 712, a priority information acquisition unit 713, an exit-possible gate information acquisition unit 714, and a priority information transmission unit 715.

The exit request information acquisition unit 711 acquires information to be transmitted to the vehicle management server 110. The information to be transmitted to the vehicle management server 110 includes a user ID and position information that are sent from the navigation apparatus 142 and a vehicle ID that is managed in the DCM 141. Thus, the exit request information acquisition unit 711 functions as an identification information acquisition means acquiring identification information (a vehicle ID, or both vehicle ID and user ID) and a position information acquisition means acquiring position information that indicates the current position.

More specifically, the exit request information acquisition unit 711 acquires a user ID that is input by an occupant through a navigation screen page in the user interface unit 305 of the navigation apparatus 142, from the navigation apparatus 142, as a part of an exit request. Also, the exit request information acquisition unit 711 acquires position information acquired by the navigation apparatus 142, from the navigation apparatus 142, as a part of the exit request. Further, the exit request information acquisition unit 711 acquires a vehicle ID managed in the DCM 141. The exit request information acquisition unit 711 sends the acquired vehicle ID, user ID, and position information to the exit request transmission unit 712 as the exit request.

The exit request transmission unit 712 transmits the exit request including the user ID, the position information, and the vehicle ID sent from the exit request information acquisition unit 711, to the vehicle management server 110.

The priority information acquisition unit 713 is one example of a priority information acquisition means, and acquires priority information that is delivered from the vehicle management server 110 in response to transmission of the exit request from the exit request transmission unit 712. The priority information acquisition unit 713 sends the acquired priority information to the priority information transmission unit 715, and transmits the priority information also to the navigation apparatus 142.

The exit-possible gate information acquisition unit 714 is one example of a gate information acquisition means, and acquires exit-possible gate information that is delivered from the vehicle management server 110 in response to transmission of the exit request from the exit request transmission unit 712. The exit-possible gate information acquisition unit 714 transmits the acquired exit-possible gate information to the navigation apparatus 142.

The priority information transmission unit 715 registers the priority information sent from the priority information acquisition unit 713 in the priority information registration unit 716 in the DCM 141. Also, the priority information transmission unit 715 carries out communications with a gate terminal 161, 162, or 163, in a certain area 201a, 202a, or 203a near each of the exit gates 201-203. Further, if the priority information transmission unit 715 has received a transmission request for priority information from a gate terminal 161, 162, or 163, the priority information transmission unit 715 transmits the priority information registered in the priority information registration unit 716. Thus, the priority information transmission unit 715 functions as a transmission means transmitting priority information to a gate terminal. After the completion of transmitting the priority information, the priority information transmission unit 715 deletes the registered priority information from the priority information registration unit 716.

Also, as illustrated in 7b of FIG. 7, the navigation apparatus 142 includes a position information acquisition unit 721, a search unit 722, and a guidance unit 723.

The position information acquisition unit 721 calculates position information (latitude and longitude) indicating the current position of the vehicle communications apparatus 140 based on information acquired from a GPS (Global Positioning System). The position information acquisition unit 721 transmits the calculated position information to the DCM 141 and sends the position information to the guidance unit 723.

The search unit 722 receives an exit request and a user ID, being input through the navigation screen page in the user interface unit 305 of the navigation apparatus 142, and transmits the exit request and the user ID together with the calculated position information to the DCM 141, as an exit request.

The search unit 722 functions as an output means displaying the priority information and the exit-possible gate information transmitted from the DCM 141 to an occupant through the navigation screen page.

Also, the search unit 722 receives a destination and a pass-by location, being input through a navigation screen page. If the search unit 722 has received exit-possible gate information from the DCM 141, the search unit 722 determines a gate position included in the exit-possible gate information as the destination or the pass-by location.

The search unit 722 searches for a route up to a destination based on the determined destination and pass-by location. That is, the search unit 722 functions as a search means searching for a route up to a destination. If a plurality of pass-by locations have been determined, the search unit 722 searches for routes for the respective pass-by locations. The search unit 722 displays the route having the minimum required time from among the routes thus acquired from the search in the navigation screen page.

The guidance unit 723 is one example of a guidance means, and, if an occupant inputs a route guidance start instruction, carries out a guidance process based on the position information that has been sent, according to the route acquired from the search.

7b of FIG. 7 illustrates the functional configuration of the DCM 141 and the navigation apparatus 142. In this regard, a functional configuration of the vehicle exit application 151 and the navigation application 152 is basically the same as the functional configuration of the DCM 141 and the navigation apparatus 142.

(3) Functional Configuration of Gate Terminal

Next, a functional configuration of the gate terminals 161-163 will be described. Because the gate terminals 161-163 have the same functional configurations, a functional configuration of the gate terminal 161 will now be described.

7c of FIG. 7 illustrates one example of a functional configuration of the gate terminal. As illustrated in 7c of FIG. 7, the gate terminal 161 includes a condition setting unit 731, a priority information reception unit 732, and an exit gate control unit 733.

The condition setting unit 731 is one example of a condition setting means, and sets conditions for the vehicle 130 to exit through exit gate 201 as "conditions" included in the gate information 610. If the condition setting unit 731 is the condition setting unit in the gate terminal 162, the condition setting unit 731 sets conditions corresponding to the current time because the conditions that are set are changed depending on a time range. Also, the condition setting unit 731 sets "conditions" in the gate information 620 such that the number of vehicles that can exit through the exit gate 202 will be smaller than the number of vehicles that can exit through the exit gate 201. In the same way, if the condition setting unit 731 is the condition setting unit in the gate terminal 163, the condition setting unit 731 sets conditions corresponding to the current time because the conditions that are set are changed depending on a time range. Also, the condition setting unit 731 sets "conditions" in the gate information 630 such that the number of vehicles that can exit through the exit gate 203 will be smaller than the number of vehicles that can exit through each of the exit gates 201 and 202.

The priority information reception unit 732 is one example of a reception means, and transmits a transmission request for priority information toward the certain area 201a near the exit gate 201. Also, if priority information has been transmitted in response to the transmitted transmission request from the DCM 141 or the portable terminal 150 being in the certain area 201a, the priority information reception unit 732 receives the priority information. The priority information reception unit 732 sends the received priority information to the exit gate control unit 733.

The exit gate control unit 733 determines whether the priority information sent from the priority information reception unit 732 satisfies the conditions that are set by the condition setting unit 731 in the gate information 610 as "conditions". If the exit gate control unit 733 has determined that the priority information satisfies the conditions, the exit gate control unit 733 controls the exit gate 201 to open the exit gate 201. That is, the exit gate control unit 733 functions as a control means that controls the exit gate according to priority information. If the exit gate control unit 733 has determined that the priority information does not satisfy the conditions, the exit gate control unit 733 sends information concerning exit-possible exit gates to the occupant without opening the exit gate 201.

Figure 8:
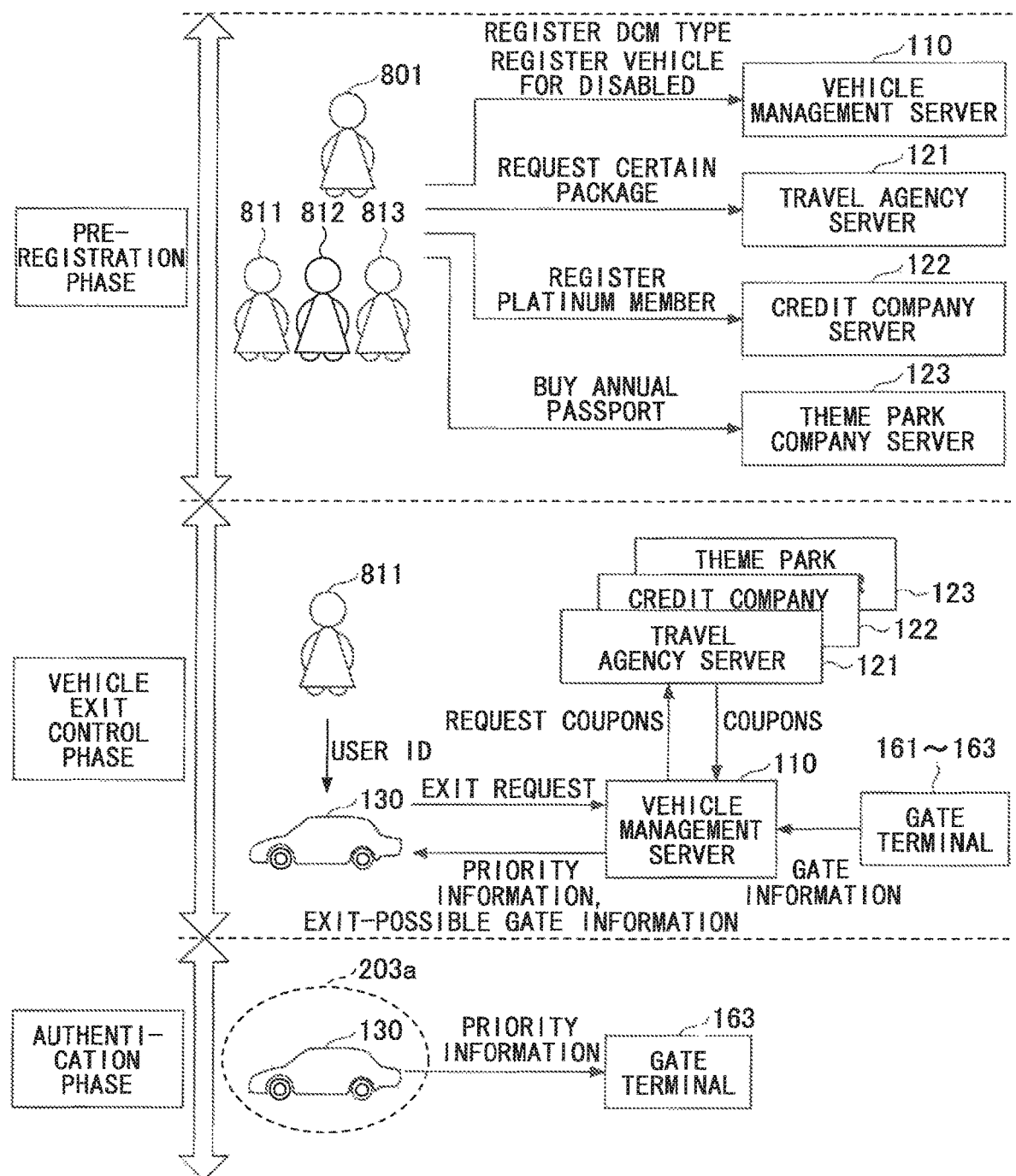
FIG. 8 illustrates an outline of processes in each phase carried out in the vehicle exit management system.

8. Description of Respective Phases Carried Out in Vehicle Exit Management System Next, an outline of processes in each phase carried out in the vehicle exit management system 100 will be described. FIG. 8 illustrates an outline of processes in each phase carried out in the vehicle exit management system 100.

As illustrated in FIG. 8, processes carried out in the vehicle exit management system 100 are generally classified into a pre-registration phase, a vehicle exit control phase, and an authentication phase.

The pre-registration phase is a phase of previously registering various items of information. According to the example of FIG. 8, an owner 801 of the vehicle 130 registers the type of the DCM that is in the vehicle, and registers information indicating that the vehicle is a vehicle for the disabled, in the vehicle management server 110.

Also, according to the example of FIG. 8, an occupant 811 of the vehicle 130 requests a certain package organized by a travel agency when purchasing a ticket for a certain event, as a user, through the travel agency server 121.

Also, according to the example of FIG. 8, an occupant 812 of the vehicle 130 makes registration to be a platinum member, as a user, through the credit company server 122. Further, according to the example of FIG. 8, an occupant 813 of the vehicle 130 purchases an annual passport for a theme park managed by the theme park company, as a user, through the theme park company server 123.

The vehicle exit control phase is a phase where, when the vehicle 130 exits the parking lot 200, the vehicle 130 sends an exit request to acquire priority information and exit-possible gate information from the vehicle management server 110.

In the vehicle exit control phase, for example, as a result of the occupant 811 inputting a user ID in the vehicle 130 (the DCM 141 or the portable terminal 150), the vehicle 130 transmits an exit request to the vehicle management server 110. Also, in the vehicle exit control phase, the vehicle management server 110 that has received the exit request requests coupons from a server 120. Also, in the vehicle exit control phase, the vehicle management server 110 modifies, based on the coupons acquired from the server 120, priority information that has been determined based on the vehicle ID, to determine priority information. Thereafter, the vehicle management server 110 delivers the determined priority information to the vehicle 130 (the DCM 141 or the portable terminal 150). Also, in the vehicle exit control phase, the vehicle management server 110 determines gates through which the vehicle 130 can exit based on the gate information acquired from the gate terminals 161-163 and the determined priority information. Further, in the vehicle exit phase, the vehicle management server 110 delivers exit-possible gate information that includes the determined exit-possible gates to the vehicle 130 (the DCM 141 or the portable terminal 150).

In the authentication phase, in a certain area near an exit gate controlled by a gate terminal, the gate terminal receives priority information from the vehicle 130 (the DCM 141 or the portable terminal 150), and determines whether conditions that are set to the gate terminal are satisfied. In the authentication phase, if the gate terminal has determined that the conditions that are set to the gate terminal are satisfied, the gate terminal controls the exit gate to open the exit gate.

According to the example of FIG. 8, in the certain area 203a near exit gate 203 managed by the gate terminal 163, the gate terminal 163 determines whether priority information received from the vehicle 130 (the DCM 141 or the portable terminal 150) satisfies conditions that are set to the exit gate 203.

9. Flow of Processes in Vehicle Exit Control Phase

Next, using FIGS. 9 and 10, detail of processes carried out in the vehicle exit control phase, from among respective processes carried out in the respective phases of the vehicle exit management system 100, will be described.

(1) In Case of Sending Exit Request after Inputting User ID

Figure 9:
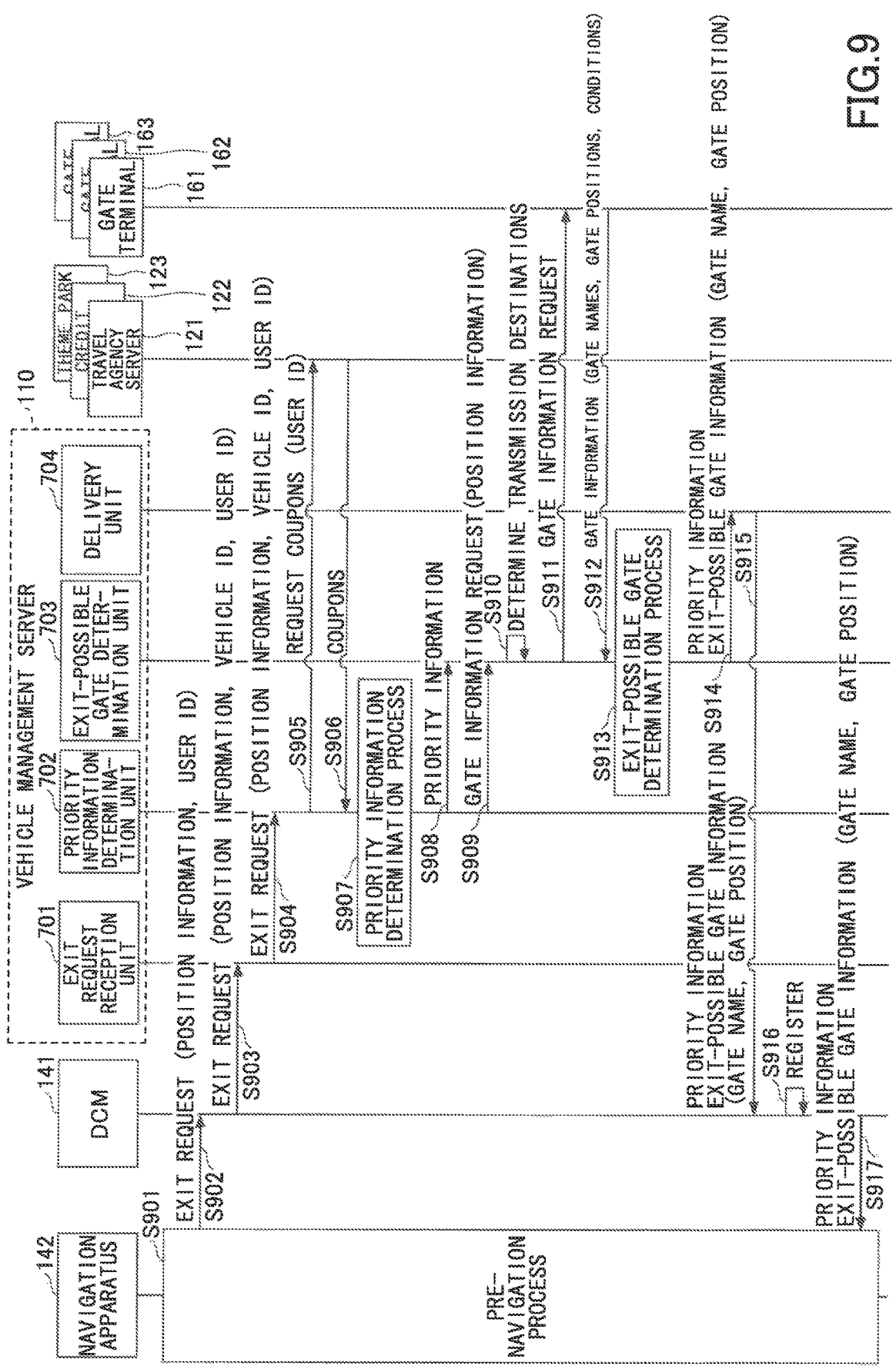
FIG. 9 illustrates a sequence diagram illustrating a flow of processes in a vehicle exit control phase.

FIG. 9 illustrates a sequence diagram illustrating a flow of processes in the vehicle exit control phase, for a case of sending an exit request after inputting a user ID. Note that, using FIG. 9, a case of using the vehicle communications apparatus 140 will be described. However, basically the same process is carried out also in a case of using the portable terminal 150.

As illustrated in FIG. 9, in step S901, the navigation apparatus 142 carries out a pre-navigation process. Detail of the pre-navigation process will be described later.

After the navigation apparatus 142 starts the pre-navigation process and an occupant of the vehicle 130 inputs an exit request through the navigation screen page, the navigation apparatus 142 prompts the occupant to input a user ID through the navigation screen page. When the occupant inputs a user ID in response, the navigation apparatus 142 receives the input. Also, the navigation apparatus 142 acquires position information that indicates the current position.

In step S902, the navigation apparatus 142 transmits an exit request that includes the user ID that has been input and the acquired position information to the DCM 141.

In step S903, the DCM 141 transmits the exit request to the vehicle management server 110, after adding the vehicle ID of the vehicle 130 to the exit request transmitted from the navigation apparatus 142.

After receiving the exit request from the DCM 141, the exit request reception unit 701 sends the exit request to the priority information determination unit 702 in step S904.

In step S905, the priority information determination unit 702 requests coupons from a server 120 based on the user ID included in the exit request that has been sent.

In step S906, the server 120 searches for any one of the sets of coupon information 510 through 530 according to the user ID to acquire the number of coupons, the number being associated with the user ID included in the request for coupons. The server 120 then transmits the acquired coupons to the priority information determination unit 702.

Note that, if the user ID included in the exit request that has been sent has been already stored in the coupon use history information 410, steps S905 and S906 are not carried out, and coupons acquired from the coupon use history information 410 according to the user ID are transmitted to the priority information determination unit 702.

In step S907, the priority information determination unit 702 carries out a priority information determination process to determine priority information based on the acquired coupons and the vehicle ID included in the exit request. Note that, detail of the priority information determination process carried out by the priority information determination unit 702 will be described later.

In step S908, the priority information determination unit 702 sends determined priority information to the exit-possible gate determination unit 703.

In step S909, the priority information determination unit 702 includes the position information that is included in the exit request in a gate information request, and sends the gate information request to the exit-possible gate determination unit 703.

In step S910, the exit-possible gate determination unit 703 determines transmission destinations to which the gate information request is to be transmitted based on the position information included in the gate information request that has been sent from the priority information determination unit 702 (in this case, as the transmission destinations, the gate terminals 161-163 are determined).

In step S911, the exit-possible gate determination unit 703 transmits the gate information request to the transmission destinations determined in step S910. The gate terminals 161-163 that have received the gate information request retrieve the sets of gate information 610-630.

In step S912, the gate terminals 161-163 transmit the sets of gate information that have been retrieved to the exit-possible gate determination unit 703. The sets of gate information transmitted from the gate terminals 161-163 include the gate names, the gate positions, and the conditions.

In step S913, the exit-possible gate determination unit 703 determines an exit gate through which the vehicle 130 can exit based on the priority information that has been sent in step S908 and the conditions included in the gate information that has been received in step S912. Note that, detail of the exit-possible gate determination process will be described later.

In step S914, the exit-possible gate determination unit 703 sends exit-possible gate information that includes the gate name and the gate position of the exit gate that has been determined to be used to exit to the delivery unit 704. Also, the exit-possible gate determination unit 703 sends the priority information that has been sent in step S908 to the delivery unit 704.

In step S915, the delivery unit 704 determines the transmission source of the exit request as a delivery destination of the priority information and the exit-possible gate information. Also, the delivery unit 704 delivers the priority information and the exit-possible gate information to the determined delivery destination. Note that, after the completion of the delivery of the priority information by the delivery unit 704, the priority information determination unit 702 updates the coupon use history information 410.

In step S916, the DCM 141 registers the received priority information in the priority information registration unit 716. Also, in step S917, the DCM 141 transmits the received priority information and exit-possible gate information to the navigation apparatus 142.

The navigation apparatus 142 displays the sent priority information and exit-possible gate information (the gate name and the gate position) while carrying out the pre-navigation process. Thereby, the occupant can know the available priority information and the exit gate which can be used to exit for exiting the parking lot 200. Also, while carrying out the pre-navigation process, the navigation apparatus 142 responds to the occupant's instruction to set a destination, a pass-by location, and so forth, and search for a route from the current position up to the destination. Note that, the exit-possible gate information is usable for setting the destination, the pass-by location, or the like.

Note that, using FIG. 9, the case where, in the vehicle exit control phase, the vehicle communications apparatus 140 (the DCM 141 and the navigation apparatus 142) is used, has been described. However, basically the same process is carried out also in a case of using the portable terminal 150. If the portable terminal 150 is used, the DCM 141 in FIG. 9 is replaced with the vehicle exit application 151, and the navigation apparatus 142 is replaced with the navigation application 152. However, if the portable terminal 150 is used, the exit request does not include a vehicle ID.

(2) In Case of Sending Exit Request without Inputting a User ID

Figure 10:
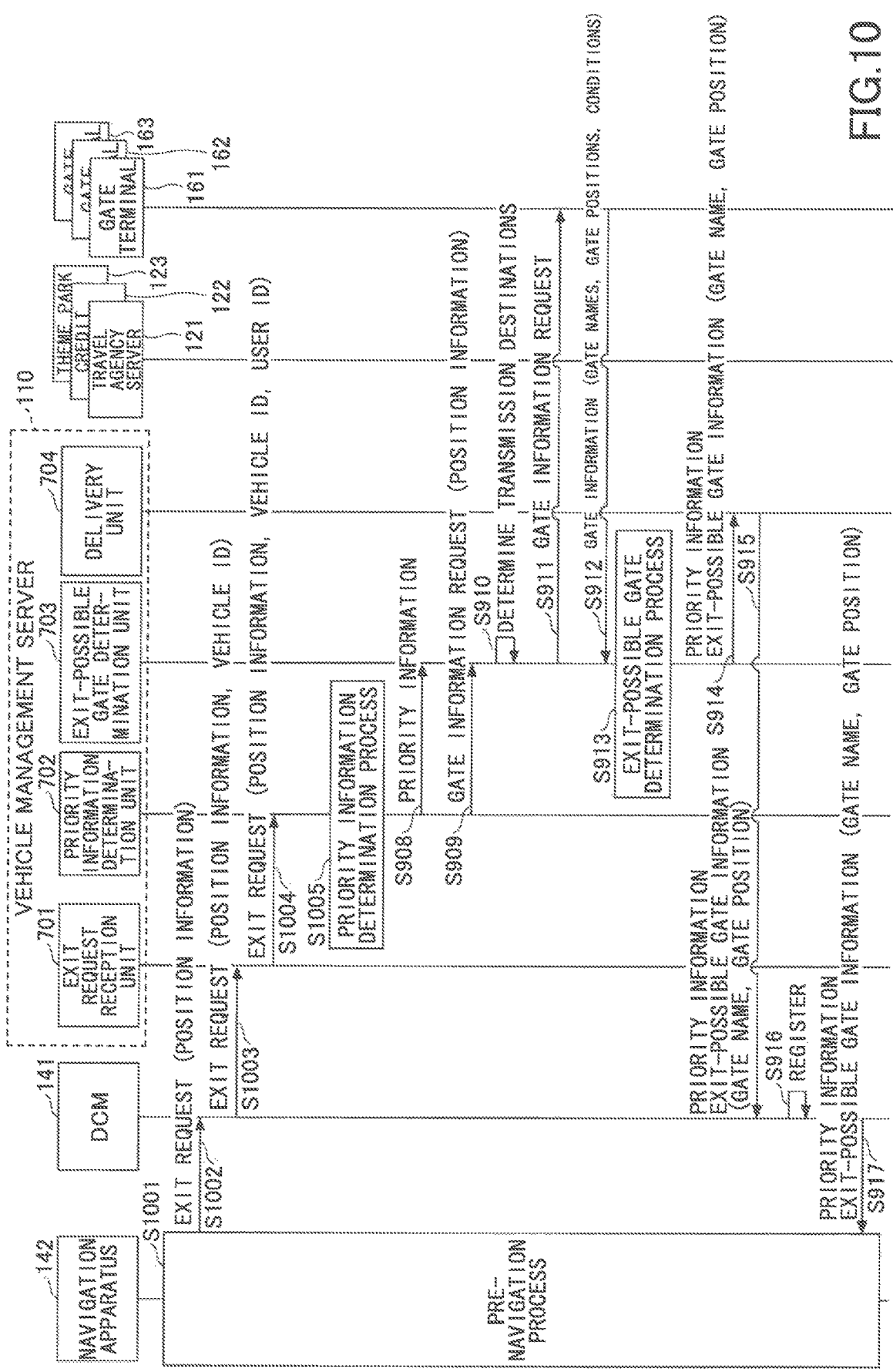
FIG. 10 is a sequence diagram illustrating processes in the vehicle exit control phase.

FIG. 10 is a sequence diagram illustrating processes in the vehicle exit control phase in a case where a user ID is not input and an exit request is made.

As illustrated in FIG. 10, in step S1001, the navigation apparatus 142 carries out a pre-navigation process. Note that, detail of the pre-navigation process will be described later.

After the navigation apparatus 142 starts the pre-navigation process, and an occupant of the vehicle 130 inputs an exit request instruction, the navigation apparatus 142 acquires the current position information.

In step S1002, the navigation apparatus 142 transmits an exit request including the acquired position information to the DCM 141.

In step S1003, the DCM 141 includes the vehicle ID of the vehicle 130 in the transmitted exit request and transmits the exit request to the vehicle management server 110.

After receiving the exit request from the DCM 141, the exit request reception unit 701 sends the exit request to the priority information determination unit 702 in step S1004.

In step S1005, the priority information determination unit 702 carries out a priority information determination process to determine priority information based on the vehicle ID included in the sent exit request. Note that, detail of the priority information determination process carried out by the priority information determination unit 702 will be described later.

Thereafter, steps S908-S917 are the same as steps S908-S917 of FIG. 9, and therefore, the description will be omitted.

11. Detail of Each Process in Vehicle Exit Control Phase

Figure 11:
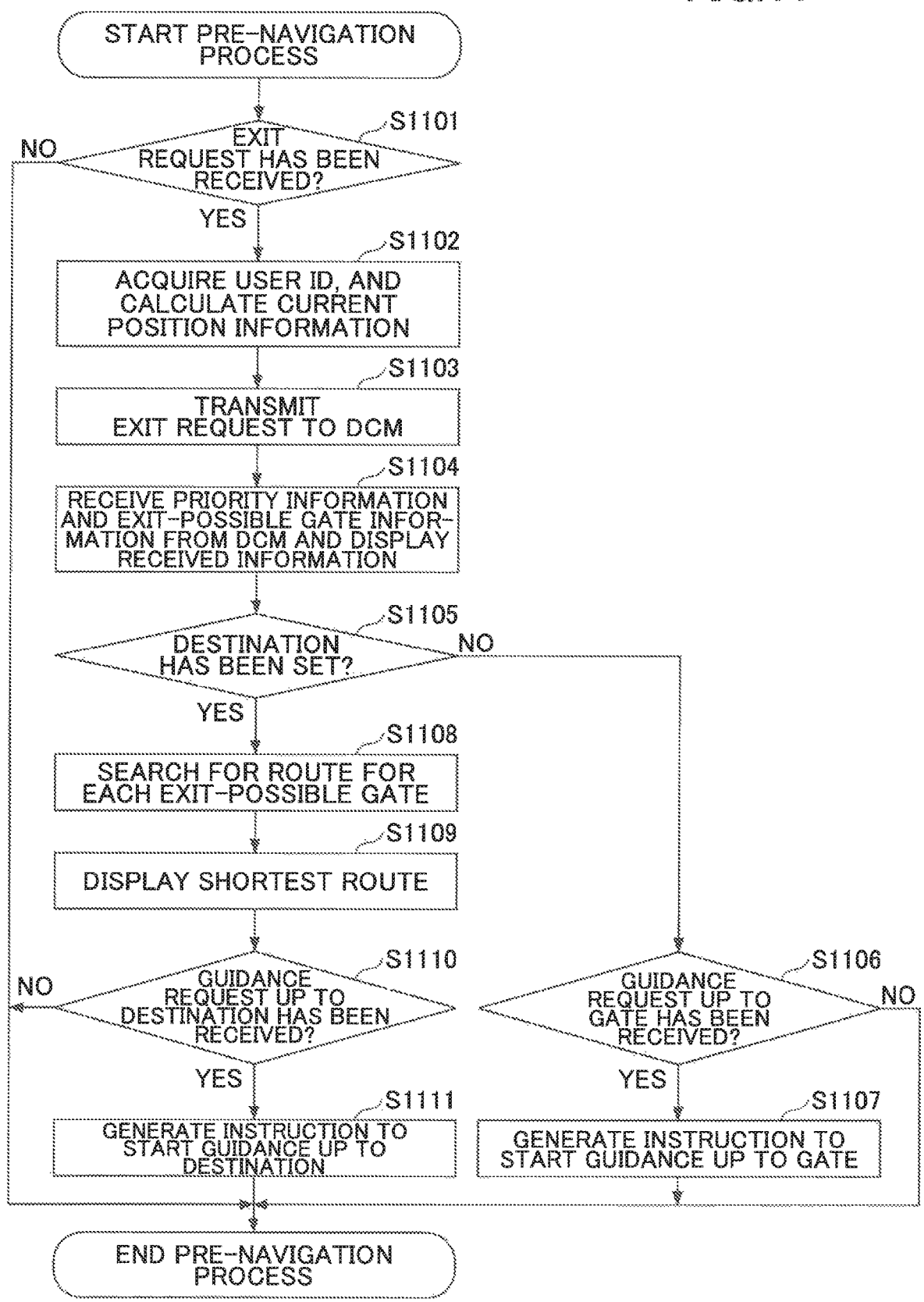
FIG. 11 is a flowchart illustrating a flow of a pre-navigation process.

Next, detail of each process (the pre-navigation process, the priority information determination process, and the exit-possible gate determination process) in the vehicle exit control phase will be described.
(1) Detail of Pre-Navigation Process FIG. 11 is a flowchart illustrating a flow of the pre-navigation process. After the navigation apparatus 142 is started, the pre-navigation process illustrated in FIG. 11 is started. In step S1101, the search unit 722 of the navigation apparatus 142 determines whether an occupant of the vehicle 130 has input an exit request instruction through the navigation screen page.

In step S1101, if the search unit 722 has determined that an exit request instruction has not been input, the pre-navigation process is ended.

On the other hand, in step S1101, if the search unit 722 has determined that an exit request instruction has been input, the process proceeds to step S1102. In step S1102, if the occupant of the vehicle 130 has input a user ID together with the exit request instruction, the search unit 722 of the navigation apparatus 142 receives the input. Also, the position information acquisition unit 721 of the navigation apparatus 142 calculates the current position information.

In step S1103, the search unit 722 of the navigation apparatus 142 transmits an exit request that includes the user ID that has been input and the calculated position information (if a user ID has not been input, the exit request includes the position information) to the DCM 141.

In step S1104, in response to transmitting the exit request to the DCM 141, the search unit 722 of the navigation apparatus 142 receives the priority information and the exit-possible gate information from the DCM 141. Also, the search unit 722 of the navigation apparatus 142 displays the received priority information and exit-possible gate information in the navigation screen page.

In step S1105, the search unit 722 of the navigation apparatus 142 determines whether the occupant of the vehicle 130 has set a destination through the navigation screen page. In step S1105, if the search unit 722 determines that a destination has not been set, the process proceeds to step S1106.

In step S1106, the search unit 722 of the navigation apparatus 142 determines whether the occupant of the vehicle 130 has input a guidance request up to an exit gate. In step S1106, if the search unit 722 determines that a guidance request up to an exit gate has not been input, the pre-navigation process is ended.

On the other hand, in step S1106, if the search unit 722 determines that a guidance request up to an exit gate has been input, the process proceeds to step S1107. In step S1107, the search unit 722 of the navigation apparatus 142 receives a selection of an exit-possible exit gate displayed in step S1104 from the occupant of the vehicle 130.

Also, the search unit 722 of the navigation apparatus 142 searches for a route up to the exit gate selected by the occupant as a destination, sends an instruction to the guidance unit 723 to start route guidance according to the route acquired from the search, and then, ends the pre-navigation process. Thus, the guidance unit 723 starts route guidance up to the exit gate.

In step S1105, if the search unit 722 determines that a destination has been set, the process proceeds to step S1108. In step S1108, the search unit 722 of the navigation apparatus 142 searches for a route up to the destination that is set in step S1105 through the exit-possible exit gate included in the exit-possible gate information received in step S1104 used as the pass-by location. Note that, if a plurality of gate names and a plurality of gate positions of the exit-possible exit gates have been acquired, the search unit 722 searches for routes up to the destination through respective exit gates.

In step S1109, the search unit 722 of the navigation apparatus 142 determines which of the routes acquired from the search requires the minimum time, and displays the determined route in the navigation screen page.

In step S1110, the search unit 722 of the navigation apparatus 142 determines whether the occupant of the vehicle 130 has input a guidance request up to the destination through the navigation screen page. In step S1110, if the search unit 722 determines that the occupant of the vehicle 130 has not input a guidance request up to the destination, the pre-navigation process is ended.

Figure 12:
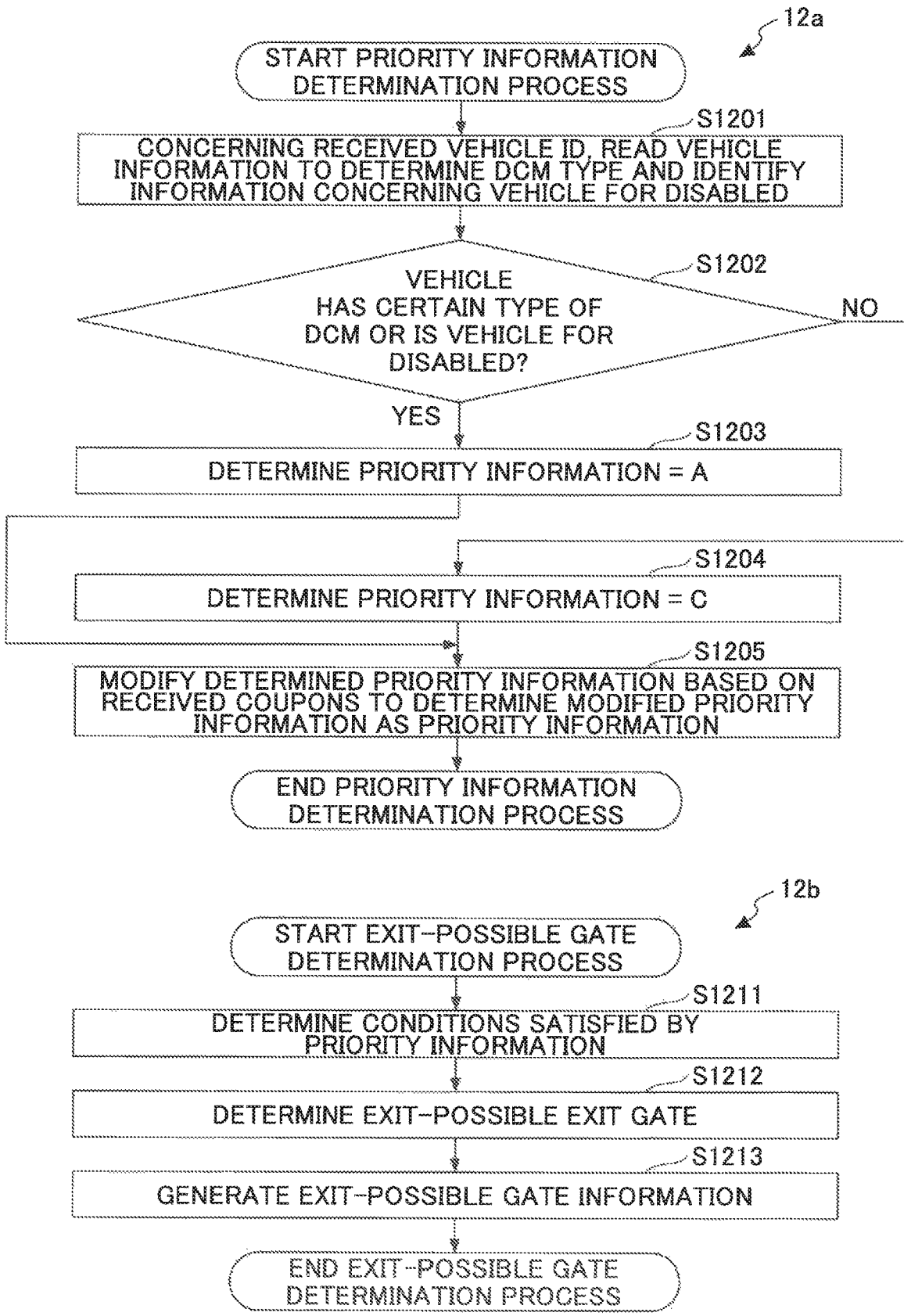
FIG. 12 is a flowchart illustrating flows of priority information determination process and an exit-possible gate determination process.

On the other hand, in step S1110, if the search unit 722 determines that the occupant of the vehicle 130 has input a guidance request up to the destination, the process proceeds step S1111. In step S1111, the search unit 722 of the navigation apparatus 142 sends an instruction to the guidance unit 723 to start route guidance up to the destination based on the shortest route determined in step S1109, and the pre-navigation process is ended. Thus, the guidance unit 723 starts route guidance up to the destination.
(2) Detail of Priority Information Determination Process 12a of FIG. 12 illustrates a flow of the priority information determination process. In step S1201, the priority information determination unit 702 reads the vehicle information 400 to determine the DCM type stored in a state of being associated with the vehicle ID included in the received exit request. Also, the priority information determination unit 702 reads the vehicle information 400 to identify information concerning whether the vehicle is a vehicle for the disabled, stored in a state of being associated with the vehicle ID included in the received exit request.

As a result of the determination in step S1201, if the vehicle identified by the vehicle ID is determined as having a DCM of a certain type (for example, the type of DCM=H), or the vehicle identified by the vehicle ID is determined as a vehicle for the disabled, the process proceeds from step S1202 to step S1203.

In step S1203, the priority information determination unit 702 determines "A" as priority information to be used when the vehicle exits the parking lot. Note that, according to the present embodiment, a priority to be used when a vehicle exits an exit gate 201, 202, or 203 with respect to another vehicle is highest if priority information is "AA"; "A", "B", and "C" follow "AA" in the stated order; and the priority is lowest if priority information is "CC".

On the other hand, as a result of the determination in step S1201, if the vehicle identified by the vehicle ID is determined as not having a DCM of a certain type, and also, the vehicle is determined as not being a vehicle for the disabled, the process proceeds from step S1202 to step S1204.

In step S1204, the priority information determination unit 702 determines priority information to be used when the vehicle exits the parking lot as "C". Note that, the priority information determination unit 702 determines the priority information as "C" also when the received exit request does not include a vehicle ID.

In step S1205, in a case where the priority information determination unit 702 has acquired coupons, the priority information determination unit 702 modifies the priority information based on the acquired coupons to determine the modified priority information as priority information to be transmitted to the DCM 141. The priority information determination unit 702 modifies the priority information in such a manner as to make the priority information higher. Note that, "modifying the priority information in such a manner as to make the priority information higher" means modifying the priority information in such a manner as to increase the number of exit-possible exit gates.

For example, if the number of coupons that the priority information determination unit 702 has acquired is one, the priority information is made higher by one level (if the priority information is C, the information is then modified to B; if the priority information is B, the information is then modified to A; and if the priority information is A, the information is then modified to AA).

Also, the priority information determination unit 702 makes the priority information higher by two levels (if the priority information is C, the priority information is then modified to A; and if the priority information is B, the priority information is then modified to AA) if the number of the acquired coupons is two.

If the number of the acquired coupons is three, the priority information determination unit 702 makes the priority information higher by three levels (for example, if the priority information is C, the priority information is then modified to AA).

Thus, the priority information determination unit 702 can determine priority information based on the vehicle information 400 and the coupon information (any one of the sets of coupon information 510 through 530).

Note that, the flow chart 12a of FIG. 12 illustrates the processes for the case where the exit request includes both the vehicle ID and the user ID. However, if the exit request does not include a user ID, step S1205 is not carried out. That is, the priority information determined in step S1203 or S1204 is determined as priority information to be transmitted to the DCM 141. If the exit request does not include a vehicle ID, steps S1201 through S1203 are not carried out, and the priority information=C that is modified in step S1205 is determined as priority information to be transmitted to the DCM 1641.

Also, in the above description, based on the coupons acquired based on the single user ID, the priority information is modified. However, it is also possible that, based on coupons acquired based on a plurality of user IDs, the priority information is modified. In this case, the numbers of coupons acquired based on the respective user IDs are summed up, and the priority information is modified.

(3) Exit-Possible Gate Determination Process 12b of FIG. 12 illustrates a flowchart of the exit-possible gate determination process. In step S1211, the exit-possible gate determination unit 703 determines, for the respective conditions included in the gate information, whether the conditions are satisfied by the priority information determined in the priority information determination process.

In step S1212, the exit-possible gate determination unit 703 determines the exit gate controlled by the gate terminal to which the conditions determined as being satisfied by the priority information are set, as an exit gate through which the vehicle 130 can exit.

In step S1213, the exit-possible gate determination unit 703 generates exit-possible gate information including the gate name and the gate position of the exit gate determined in the step S1212 as being able to be used to exit, and ends the exit-possible gate determination process.

12. Authentication Process in Authentication Phase

Figure 13:
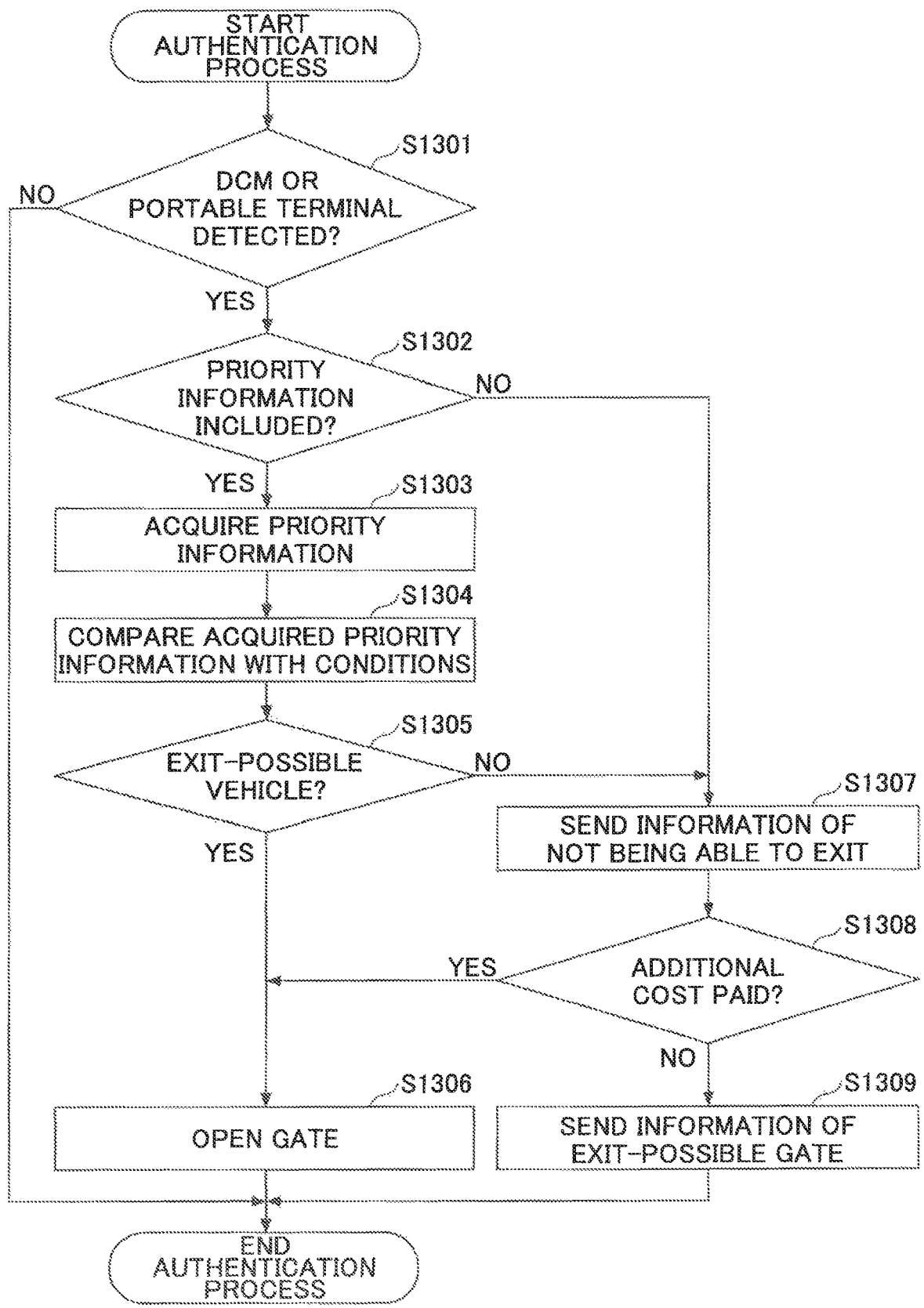
FIG. 13 is a flowchart illustrating a flow of an authentication process.

Next, a process (an authentication process) carried out by the gate terminals 161-163 in the authentication phase will be described. FIG. 13 is a flowchart illustrating a flow of the authentication process. Description will now be made using the authentication process carried out by the gate terminal 163 as an example.

In step S1301, the gate terminal 163 determines whether the gate terminal 163 has detected the DCM 141 or the portable terminal 150 in the certain area 203a near the exit gate 203. More specifically, the gate terminal 161 transmits a signal (including a request to transmit priority information) having a radio wave arrival range that is the certain area 203a near the exit gate 203 to determine whether the gate terminal 161 has received a reply signal from the DCM 141 or the portable terminal 150. If the gate terminal 163 determines that the gate terminal 163 has received a reply signal from the DCM 141 or the portable terminal 150, the gate terminal 163 determines that the gate terminal 163 has detected the DCM 141 or the portable terminal 150. If the gate terminal 163 determines that the gate terminal 163 has not received a reply signal from the DCM 141 or the portable terminal 150, the gate terminal 163 determines that the gate terminal 161 has not detected the DCM 141 or the portable terminal 150 to end the authentication process.

In step S1302, the gate terminal 163 determines whether the reply signal includes priority information. In step S1302, if the gate terminal 163 determines that the reply signal does not include priority information, the process proceeds to step S1307.

On the other hand, in step S1302, if the gate terminal 163 determines that the reply signal includes priority information, the process proceeds to step S1303. In step S1303, the gate terminal 163 acquires the priority information included in the reply signal.

In step S1304, the gate terminal 163 compares the acquired priority information with the conditions that are set in the gate information 630.

In step S1305, the gate terminal 163 determines whether the vehicle 130 that has the detected DCM 141 or the vehicle 130 that has therein the occupant who has the detected portable terminal 150 is an exit-possible vehicle.

The gate terminal 163 determines the vehicle 130 as an exit-possible vehicle if the gate terminal 163 determines that the acquired priority information satisfies the conditions that are set in the gate information 610. In this case, the process proceeds to step S1306. In step S1306, the gate terminal 163 carries out control to open the exit gate 203.

On the other hand, if the gate terminal 163 determines that the acquired priority information does not satisfy the conditions that are set in the gate information 630, the gate terminal 163 determines the vehicle 130 as not being an exit-possible vehicle. In this case, the process proceeds to step S1307.

In step S1307, the gate terminal 163 indicates that it is not possible to exit, to the occupant of the vehicle 130.

In step S1308, the gate terminal 163 determines whether the occupant of the vehicle 130 has paid an additional cost. In step S1308, if the gate terminal 163 determines that an additional cost has been paid, the gate terminal 163 proceeds to step S1306. In this case, the gate terminal 163 controls the exit gate 201 to open the exit gate 201.

On the other hand, in step S1308, if the gate terminal 163 determines that no additional cost has been paid, the gate terminal 163 indicates an exit-possible exit gate to the occupant of the vehicle 130. More specifically, the gate terminal 163 searches for a gate terminal (for example, the gate terminal 161) to which the conditions that are satisfied by the priority information acquired in step 1303 are set. Then, the gate terminal 163 sends information of the gate name and the gate position of the exit gate controlled by the gate terminal acquired from the search to the occupant of the vehicle 130.

13. Examples

Next, examples for a case where processes are carried out in the vehicle exit management system 100 will be described. First, actual examples of information (priority information, exit-possible vehicle information, and exit-possible gate information) generated by the vehicle management server 110 when processes are carried out in the vehicle exit management system 100 will be described. FIG. 14 illustrates examples of priority information, exit-possible vehicle information, and exit-possible gate information.

14a of FIG. 14 illustrates one example of priority information generated by the priority information determination unit 702 in the priority information determination process (step S907). According to the example of 14a of FIG. 14, priority information of an occupant identified by user ID=U203 is determined as AA.

14b of FIG. 14 illustrates one example of exit-possible vehicle information generated during a process where the exit-possible gate determination unit 703 carries out the exit-possible gate determination process (step S913).

As illustrated in FIG. 2, in the parking lot 200, the three exit gates having gate IDs=G01-G03, i.e., the exit gate 201 (first eastern gate), the exit gate 202 (second eastern gate), and the exit gate 203 (western gate) are installed. Therefore, as illustrated in 14b of FIG. 14, the exit-possible gate determination unit 703 acquires gate information of the three exit gates 201-203 having the gate IDs=G01-G03.

Note that, conditions are set to the gate terminal 161 that controls the exit gate 201 (first eastern gate) such that a vehicle having priority information of any one of "AA, A, B, C" will be an exit-possible vehicle. Conditions are set to the gate terminal 162 that controls the exit gate 202 (second eastern gate) such that a vehicle having priority information of any one of "AA, A" will be an exit-possible vehicle. Conditions are set to the gate terminal 163 that controls the exit gate 203 (western gate) such that a vehicle having priority information of "AA" will be an exit-possible vehicle.

According to the example of 14b of FIG. 14, the exit-possible gate determination unit 703 determines that, through the exit gate of the gate ID="G01", the vehicles identified by the vehicle IDs=C1 and C2 and the vehicles that have therein the occupants identified by the user IDs=U101-U303 can exit. Also, the exit-possible gate determination unit 703 determines that, through the exit gate of the gate ID="G02", the vehicle identified by the vehicle ID=C1 and the vehicles that have therein the occupants identified by the user IDs=U203, U101, and U301 can exit. Further, the exit-possible gate determination unit 703 determines that, through the exit gate of the gate ID="G03", the vehicle that has therein the occupant identified by user ID=U203 can exit.

Note that, if priority information is determined by a vehicle ID, the exit-possible gate determination unit 703 determines exit-possible vehicles for each vehicle ID. Also, if priority information is determined by a user ID, the exit-possible gate determination unit 703 determines exit-possible vehicles for each user ID. Further, if priority information is determined based on a vehicle ID and a user ID, the exit-possible gate determination unit 703 determines exit-possible vehicles for each user ID.

14c of FIG. 14 illustrates one example of exit-possible gate information generated as a result of the exit-possible gate determination unit 703 carrying out the exit-possible gate determination process (step S913).

According to the example of 14c of FIG. 14, exit gates through which the vehicle that has therein the occupant identified by user ID=U203 can exit have the gate names=first eastern gate, second eastern gate, and western gate.

Next, an arrangement of vehicles in the parking lot 200 will be described as an example for a case where processes are carried out in the vehicle exit management system 100.

Figure 15:
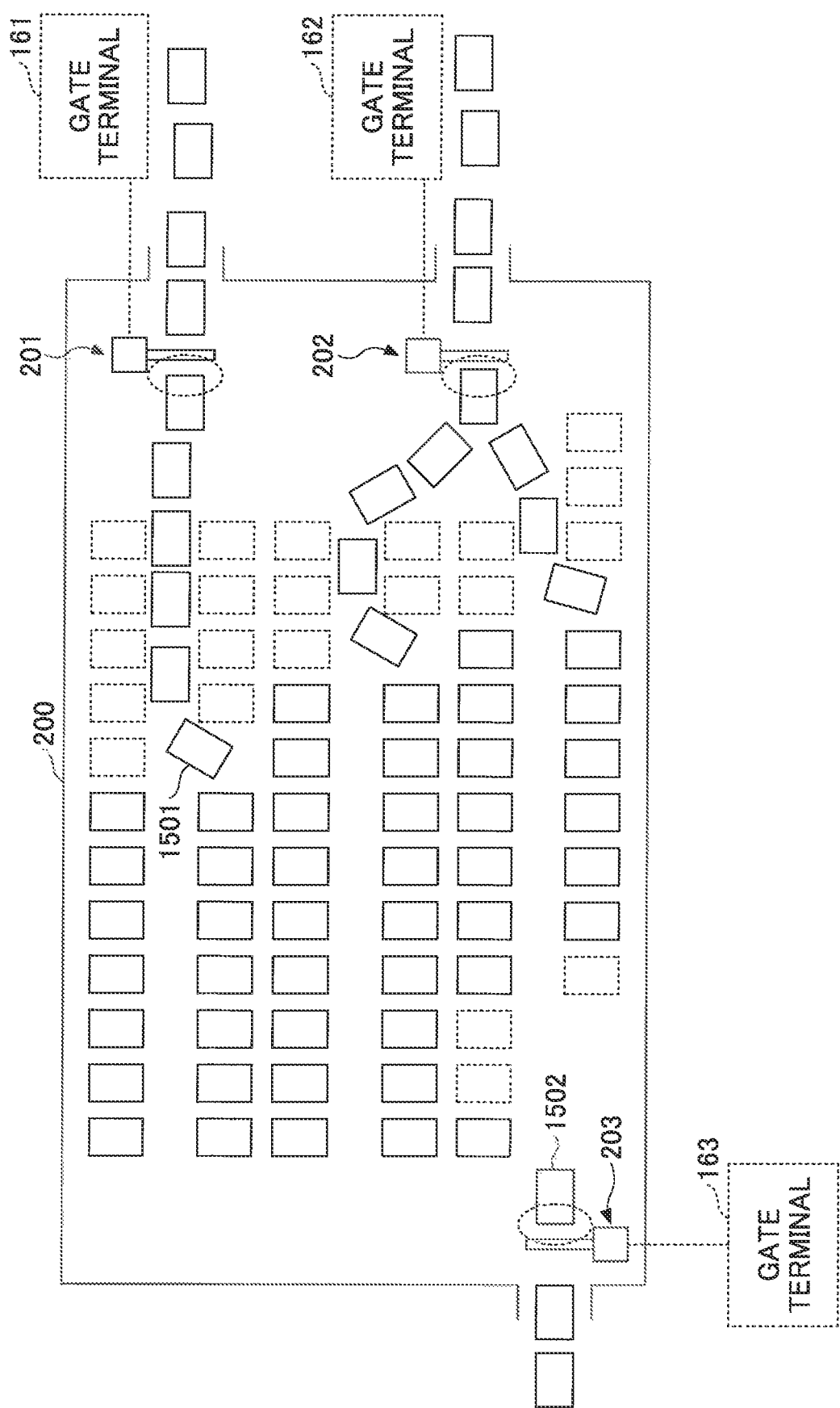
FIG. 15 illustrates a state in a parking lot for a case where processes have been carried out in the vehicle exit management system.

FIG. 15 illustrates a state in the parking lot when processes have been carried out in the vehicle exit management system. When processes have been carried out in the vehicle exit management system 100, the number of exit-possible vehicles that can exit through the exit gate 201 is greater than the number of exit-possible vehicles that can exit through the exit gate 202 and is greater than the number of exit-possible vehicles that can exit through the exit gate 203. Therefore, in a route toward the exit gate 201, congestion occurs, and, a long time is required for the vehicle 1501, for example, to exit.

On the other hand, the number of exit-possible vehicles that can exit through the exit gate 203 is smaller than the numbers of exit-possible vehicles that can exit through the exit gates 201 and 202. Therefore, no congestion occurs in a route toward the exit gate 203. Thus, it is possible to reduce the time required for a certain vehicle 1502 (for example, the vehicle that has therein the occupant identified by user ID=U203) to exit than the time required for another vehicle 1501 to exit.

14. Summary

As can be seen from the above description, the vehicle exit management system 100 of the present embodiment has the following features:

- The DCM transmits an exit request including both or either one of a vehicle ID and a user ID; acquires priority information indicating a priority with respect to another vehicle to be used when a vehicle exits through an exit gate, via a network; and holds the priority information in the DCM.
- The portable terminal transmits an exit request including a user ID; acquires priority information indicating a priority with respect to another vehicle to be used when a vehicle exits through an exit gate, via a network; and holds the priority information in the portable terminal.
- If one of the DCM and the portable terminal is in a certain area near an exit gate, the one of the DCM and the portable terminal transmits the priority information held in the one of the DCM and the portable terminal to a gate terminal.
- If the priority information transmitted by the one of the DCM and the portable terminal satisfies conditions that are set to the gate terminal, the gate terminal opens the exit gate that the gate terminal controls.

Thus, it is possible to manage exit-possible exit gates for each vehicle that exits a parking lot.

Also, the vehicle exit management system 100 according to the present embodiment has the following features:

- Differences are created among conditions that are set to gate terminals controlling a plurality of exit gates of a parking lot, respectively.

Thereby, there are differences among the numbers of exit-possible vehicles for the respective exit gates. As a result, it is possible to allow a vehicle that has a communications apparatus that acquires certain priority information (or a vehicle that has therein an occupant who has a communications apparatus that acquires certain priority information) to exit through an exit gate having a small number of exit-possible vehicles. Thus, it is possible to reduce the time required for a certain vehicle to exit.

Also, the vehicle exit management system 100 according to the present embodiment has the following features:

- As a result of conditions that are set to each of a plurality of gate terminals being compared with priority information, exit gates through which a vehicle can exit are previously determined, and are displayed to an occupant through a navigation screen page.
- The navigation apparatus or the navigation application sets an exit-possible exit gate as a destination or a pass-by location to search for a route having the shortest required time.

Thereby, the occupant can easily see exit-possible exit gates through the navigation screen page without checking the conditions for exiting for each of the plurality of exit gates. Also, a vehicle can be made to smoothly travel up to an exit-possible exit gate. Further, a vehicle can be made to travel using a route having the shortest required time up to a destination.

Second Embodiment

According to the above-mentioned first embodiment, the vehicle management server 110 is provided, and the DCM 141 or the portable terminal 150 acquires priority information through the vehicle management server 110. In contrast thereto, according to a second embodiment, the DCM 141 or the portable terminal 150 acquires priority information without using the vehicle management server 110. Below, the second embodiment will be described mainly for the differences from the above-mentioned first embodiment.

<1. Configuration of Vehicle Exit Management System>

Figure 16:
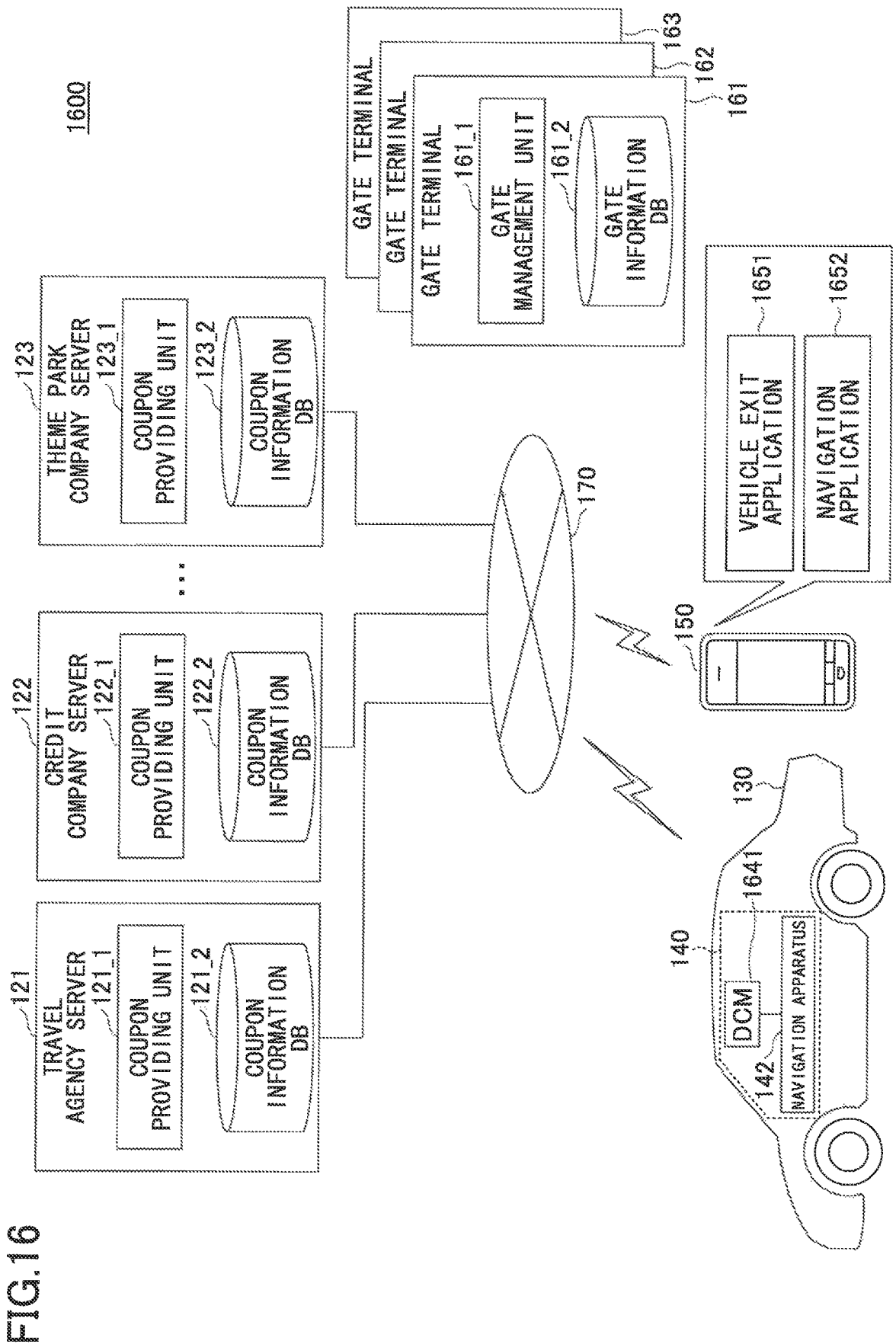
FIG. 16 illustrates a configuration example of a vehicle exit management system.

First, a configuration of a vehicle exit management system according to the second embodiment will be described. FIG. 16 illustrates a configuration example of the vehicle exit management system. The vehicle exit management system 1600 illustrated in FIG. 16 is different from the vehicle exit management system 100 in that the vehicle exit management system 1600 does not include the vehicle management server 110. Also, the function of a DCM 1641, and the function of a vehicle exit application 1651 of the portable terminal 150 are different from the function of the DCM 141 and the function of the vehicle exit application 151 of the portable terminal 150. Further, the gate terminals 161-163 are not connected to the network 170.

Note that, because the vehicle exit management system 1600 does not include the vehicle management server 110, the vehicle information 400 is not used for determining priority information. Also, because the gate terminals 161-163 are not connected to the network 170, the exit-possible gate determination process is not carried out, and exit-possible gate information is not generated.

<2. Functional Configuration of DCM>

Figure 17:
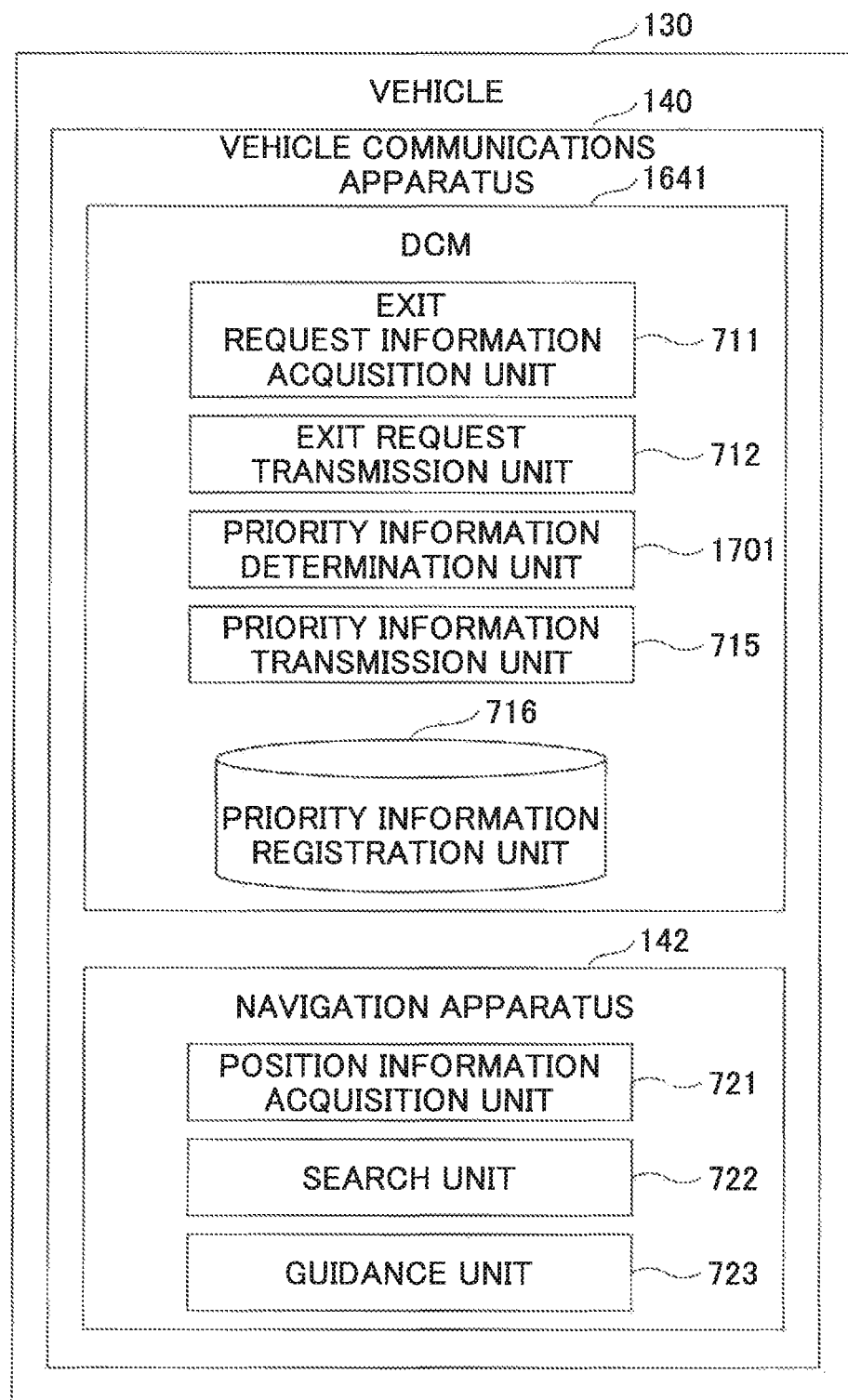
FIG. 17 illustrates one example of a functional configuration of a vehicle.

Next, a functional configuration of the DCM 1641 of the vehicle 130 will be described. FIG. 17 illustrates one example of a functional configuration of the DCM.

What is different between the functional configuration of the DCM 1641 in FIG. 17 and the functional configuration of the DCM 141 is that the functional configuration of the DCM 1641 includes a priority information determination unit 1701 instead of the priority information acquisition unit 713, and does not include the exit-possible gate information acquisition unit 714.

The priority information determination unit 1701 acquires coupons that are transmitted by the server 120 in response to transmission of an exit request from the exit request transmission unit 712. Also, the priority information determination unit 1701 determines priority information based on the acquired coupons, and registers the priority information in the priority information registration unit 716. That is, the priority information determination unit 1701 functions as a priority information acquisition means that acquires priority information for transmission to the gate terminal 161, 162 or 163. The method for determining priority information based on acquired coupons has been already described concerning the above-mentioned first embodiment using 12a of FIG. 12, and the description will be omitted here.

Note that, while FIG. 17 illustrates the functional configuration of the DCM 1641, the functional configuration of the vehicle exit application 151 is basically the same.

<3. Flow of Processes in Vehicle Exit Control Phase>

Next, among the respective phases carried out in the vehicle exit management system 1600, processes in the vehicle exit control phase will be described in detail using FIG. 18. Using FIG. 18, a case of using the vehicle communications apparatus 140 will be described. In this regard, a case of using the portable terminal 150 is basically the same as the case of using the vehicle communications apparatus 140.

Figure 18:
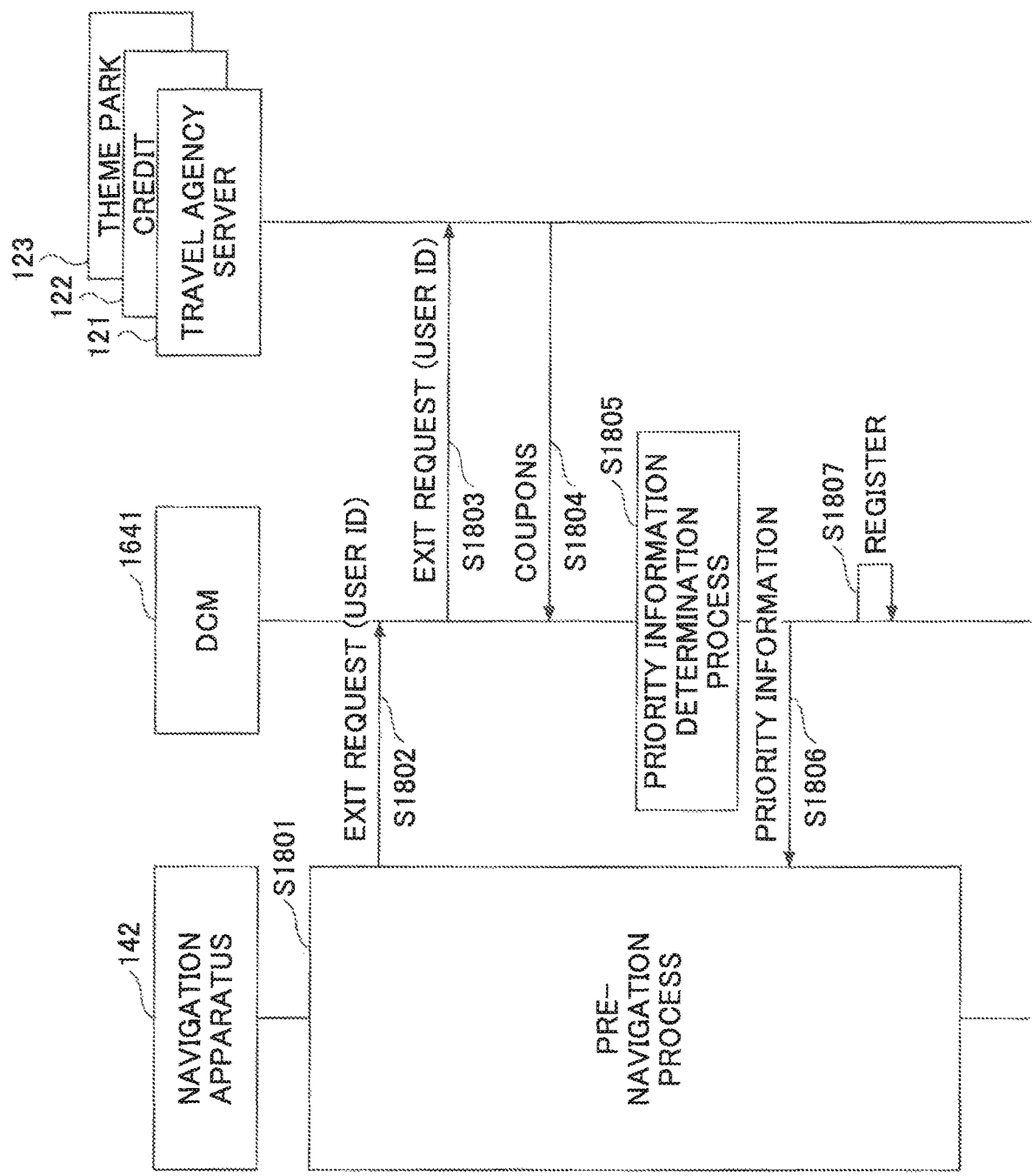
FIG. 18 is a sequence diagram illustrating a flow of processes in a vehicle exit control phase.

FIG. 18 is a sequence diagram illustrating a flow of processes in the vehicle exit control phase. As illustrated in FIG. 18, in step S1801, the navigation apparatus 142 carries out a pre-navigation process. After the navigation apparatus 142 starts the pre-navigation process, and an occupant of the vehicle 130 inputs an exit request instruction, the navigation apparatus 142 prompts the occupant to input a user ID through the navigation screen page. After the occupant inputs a user ID in response, the navigation apparatus 142 receives the input. Note that the pre-navigation process will be described later in detail.

In step S1802, the navigation apparatus 142 transmits an exit request that includes the user ID that has been input, to the DCM 1641.

In step S1803, the DCM 1641 transmits the transmitted exit request to a server 120 corresponding to the user ID.

After receiving the exit request, the server 120 reads the coupon information DB (any one of the sets of coupon information DBs 121_2-123_2) to acquire the number of coupons, the number being associated with the user ID included in the exit request, in step S1804. The server 120 transmits the acquired coupons to the DCM 1641 that has transmitted the exit request.

In step S1805, the DCM 1641 carries out a priority information determination process based on the coupons acquired from the server 120. Note that, the priority information determination process has been already described in detail concerning the first embodiment, and therefore, the description will be omitted here.

In step S1806, the DCM 1641 transmits priority information determined through the priority information determination process to the navigation apparatus 142.

In step S1807, the DCM 1641 registers the determined priority information in the priority information registration unit 716 in the DCM 1641.

<4. Detail of Pre-Navigation Process>

Figure 19:
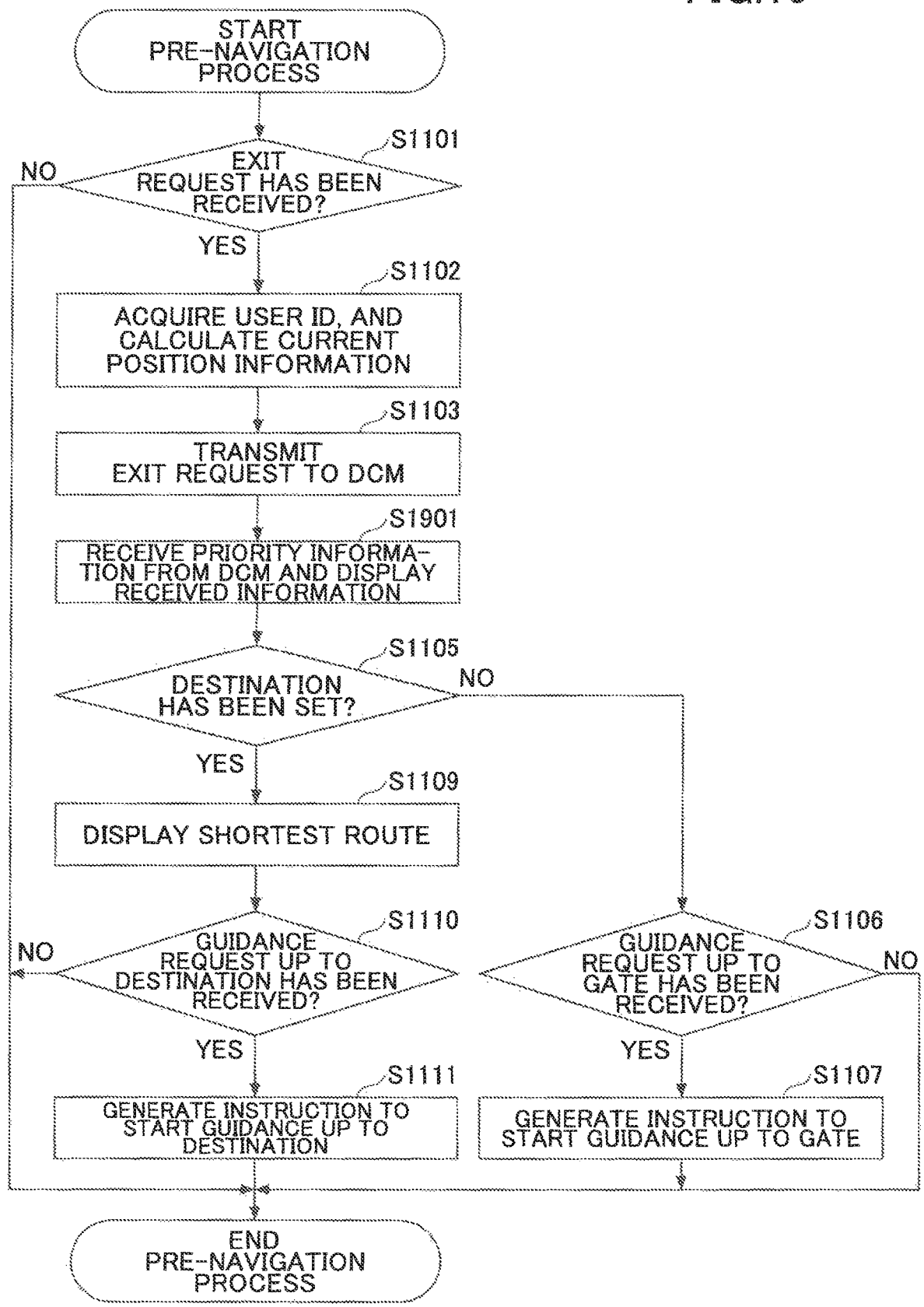
FIG. 19 is a flowchart illustrating a flow of a pre-navigation process.

FIG. 19 is a flowchart illustrating a flow of a pre-navigation process. What is different from the pre-navigation process illustrated in FIG. 11 is that, in FIG. 19, step S1901 is included instead of step S1104, and step S1108 is not included.

In step S1901, the search unit 722 of the navigation apparatus 142 receives the priority information from the DCM 1641, and displays the received priority information in the navigation screen page. Because the DCM 1641 does not transmit exit-possible gate information, the search unit 722 does not display exit-possible gate information in the navigation screen page. Also, a gate position of an exit-possible exit gate is not automatically set as a pass-by location. Therefore, after a destination is set in step S1105, the search unit 722 searches for a route having the shortest required time based on the destination that has been set, and displays the route in the navigation screen page.

<5. Summary>

As can be seen from the above description, the vehicle exit management system 1600 according to the present embodiment has the following features.

The DCM or the portable terminal transmits an exit request including a user ID to acquire coupons to be used for priority information that indicates a priority with respect to another vehicle to be used when a vehicle exits through an exit gate, via a network.

The DCM or the portable terminal determines priority information based on the acquired coupons, and holds the priority information in the DCM or the portable terminal.

If one of the DCM and the portable terminal is in a certain area near an exit gate, the one of the DCM and the portable terminal transmits the held priority information to a gate terminal.

If the priority information transmitted from the one of the DCM and the portable terminal satisfies conditions that are set to the gate terminal, the gate terminal opens the exit gate that the gate terminal controls.

Thus, it is possible to manage exit-possible exit gates for each vehicle that exits a parking lot.

Also, the vehicle exit management system 1600 according to the present embodiment has the following features.

Conditions that are set to respective gate terminals controlling a plurality of exit gates of a parking lot are made different.

Thus, the numbers of exit-possible vehicles will be different among the exit gates. As a result, it is possible to allow a vehicle that has a communications apparatus acquiring certain priority information (or a vehicle that has therein an occupant who has a communications apparatus acquiring certain priority information) to exit through an exit gate that has exit-possible vehicles the number of which is smaller. Thus, it is possible to reduce the time required for a certain vehicle to exit.

[Variants]

In the above-mentioned first and second embodiments, the vehicle communications apparatus 140 includes the navigation apparatus 142, and the portable terminal 150 includes the navigation application 152. However, it is also possible that the vehicle communications apparatus 140 does not include the navigation apparatus 142. Also, it is possible that the portable terminal 150 does not include the navigation application 152.

Also, in the above-mentioned first and second embodiments, conditions that are set to the gate terminals 161-163, respectively, vary depending on a time range. However, the present invention is not limited thereto. For example, it is also possible that a congestion state in the parking lot 200 is determined from the number of vehicles that have been parked in the parking lot 200, and the conditions that are set are changed according to the congestion state.

Concerning the above-described embodiments and variants, the following aspects will now be further disclosed.

(Aspect 1)

A vehicle exit management system includes:

a plurality of gate terminals configured to control respective exit gates of a parking lot;

a communications apparatus configured to, in the case of the communications apparatus being in an area near any one of the exit gates, carry out communications with the corresponding gate terminal; and a server apparatus connected with the communications apparatus via a network.

The communications apparatus includes:

an identification information acquisition means configured to acquire identification information identifying a vehicle or an occupant of the vehicle, a priority information acquisition means configured to acquire priority information determined with the use of information that is stored in the server apparatus in a state of being associated with the identification information, the priority information indicating a priority with respect to another vehicle to be used when the vehicle that has therein the occupant exits through any one of the exit gates, and a transmission means configured to, in the case of the communications apparatus being in an area near any one of the exit gates, transmit the priority information acquired by the priority information acquisition means to the corresponding gate terminal.

Each of the gate terminals includes:

a condition setting means configured to set conditions for the vehicle to exit through the exit gate, a reception means configured to receive the priority information transmitted by the transmission means, and a control means configured to control the exit gate to open the exit gate in the case of the priority information received by the reception means satisfying the conditions that are set by the condition setting means.

According to Aspect 1, it is possible to manage exit-possible exit gates for each vehicle that exits a parking lot.
(Aspect 2)

In the vehicle exit management system according to Aspect 1, the condition setting means of a first gate terminal that controls a first exit gate of the exit gates is configured to set such conditions that the number of vehicles that can exit through the first exit gate will be smaller than the number of vehicles that can exit through a second exit gate according to conditions that are set by the condition setting means of a second gate terminal that controls the second exit gate.

According to Aspect 2, it is possible to shorten the time required for a certain vehicle to exit.
(Aspect 3)

In the vehicle exit management system according to Aspect 2, the communications apparatus further includes:

a gate information acquisition means configured to acquire, from the server apparatus, information of an exit-possible gate that is an exit gate controlled by a gate terminal of the gate terminals, the gate terminal being set to conditions that are satisfied by the priority information acquired by the priority information acquisition means, and an output means configured to output the information of the exit-possible gate.

According to Aspect 3, it is possible for the occupant of the vehicle to easily see the exit-possible exit gate through a navigation screen page without checking conditions for exiting for each of the exit gates.
(Aspect 4)

In the vehicle exit management system according to Aspect 3, the communications apparatus further includes:

a search means configured to set a destination of the vehicle to search for a route to the destination that is set; and a guidance means configured to carry out route guidance according to the route to the destination acquired through a search carried out by the search means.

According to Aspect 4, the occupant of the vehicle can cause the vehicle to travel to the destination smoothly.
(Aspect 5)

In the vehicle exit management system according to Aspect 4, the search means is further configured to set the information of the exit-possible gate as the destination.

According to Aspect 5, the occupant of the vehicle can travel by the vehicle to the exit-possible gate smoothly.
(Aspect 6)

In the vehicle exit management system according to Aspect 4, the search means is configured to, in the case of the gate information acquisition means acquiring a plurality of sets of information of the exit-possible gates, search for a plurality of routes using the plurality of sets of information of the exit-possible gates as pass-by locations, respectively; and select and display a single route from among the plurality of routes acquired through the search, based on respective times required to reach the destination using the plurality of routes acquired through the search.

According to Aspect 6, the occupant of the vehicle can set the route having the shortest time required to exit through an exit-possible gate and reach the destination.
(Aspect 7)

In the vehicle exit management system according to any one of Aspects 1-6, a priority indicated by priority information acquired by a communications apparatus of a certain type in the vehicle is higher than a priority indicated by priority information acquired by a communications apparatus of a type other than the certain type in the vehicle.

According to Aspect 7, the occupant of the vehicle can acquire priority information of higher priority without inputting a user ID in the case of the vehicle having the communications apparatus of the certain type.
(Aspect 8)

In the vehicle exit management system according to any one of Aspects 1-6, the communications apparatus further includes a reception means configured to receive identification information that has been input, the identification information identifying the occupant of the vehicle; and the identification information acquisition means is further configured to acquire the identification information that the reception means has received.

According to Aspect 8, it is possible to acquire the priority information corresponding to the identification information identifying the occupant of the vehicle. Therefore, the occupant can acquire the priority information by inputting the occupant's identification information even in a case where the occupant uses a plurality of vehicles, for example, in a car sharing system.
(Aspect 9)

In the vehicle exit management system according to any one of Aspects 1-8, the condition setting means is further configured to change the conditions to be set according to a congestion state of the parking lot.

According to Aspect 9, based on the congestion state of a parking lot, only in response to a determination of the state as necessary, it is possible to control the number of vehicles that can exit through a certain exit gate.
(Aspect 10)

A gate terminal controls an exit gate of a parking lot by carrying out communications with a communications apparatus that is in an area near the exit gate.

The gate terminal includes:

a condition setting means configured to set conditions for a vehicle to exit through the exit gate, a reception means configured to receive, from the communications apparatus, priority information that is acquired by the communications apparatus based on identification information identifying the vehicle or an occupant of the vehicle, the priority information indicating a priority with respect to another vehicle to be used when exiting through the exit gate, and a control means configured to control the exit gate to open the exit gate in the case of the priority information received by the reception means satisfying the conditions that are set by the condition setting means.

The condition setting means is configured to set such conditions that the number of vehicles that can exit through the exit gate will be smaller than the number of vehicles that can exit through another exit gate according to conditions that are set by the condition setting means of another gate terminal that controls the another exit gate.

According to Aspect 10, it is possible to reduce the required time for a certain vehicle to exit.

The present invention is not limited to the configurations described above such as the configurations of the above-mentioned embodiments, and combinations with other elements, and so forth, can be made. In this regard, it is possible to change the configurations without departing from the scope and the spirit of the present invention, and it is possible to appropriately determine configurations depending on applications.

The present application is based on and claims the priority of Japanese Patent Application No. 2015-247957 filed Dec. 18, 2015, and the entire contents of Japanese Patent Application No. 2015-247957 are herewith incorporated by reference.

DESCRIPTION OF REFERENCE NUMERALS

100: vehicle exit management system
110: vehicle management server
111: vehicle exit management unit
121: travel agency server
122: credit company server
123: theme park company server
130: vehicle
140: vehicle communications apparatus
141: DCM
142: navigation apparatus
150: portable terminal
151: vehicle exit application
152: navigation application
161-163: gate terminals
161_1: gate management unit
701: exit request reception unit
702: priority information determination unit
703: exit-possible gate determination unit
704: delivery unit
711: exit request information acquisition unit
712: exit request transmission unit
713: priority information acquisition unit
714: exit-possible gate information acquisition unit
715: priority information transmission unit
716: priority information registration unit
721: position information acquisition unit
722: search unit
723: guidance unit
731: condition setting unit
732: priority information reception unit
733: exit gate control unit
1701: priority information determination unit

The invention claimed is:

1. A vehicle exit management system comprising:
a plurality of gate terminals configured to control exit gates of a parking lot;
a communications apparatus installed in a vehicle configured to carry out communications with a corresponding gate terminal when the communications apparatus is in an area corresponding to one of the exit gates;
a server apparatus connected with the communications apparatus via a network, wherein:
the communications apparatus includes a controller being configured to:
acquire identification information identifying the vehicle or an occupant of the vehicle,
acquire priority information determined with the use of information that is stored in the server apparatus in a state of being associated with the identification information, the priority information indicating one of at least three different priority levels for the vehicle, each priority level having a different level of priority with respect to the other priority levels, the one priority level to be used when the vehicle that has therein the occupant exits through any one of the exit gates,
store the acquired priority information, and
in the case of the communications apparatus being in the area corresponding to one of the exit gates, transmit the stored priority information to the corresponding gate terminal; and
a navigation apparatus connected to the communications apparatus configured to receive the stored priority information, wherein:
each of the plurality of gate terminals includes a processor programmed to execute the following:
set conditions for the vehicle to exit through the exit gate,
receive the transmitted priority information, and
control the exit gate to open the exit gate when the received priority information satisfies the set conditions.

2. The vehicle exit management system as claimed in claim 1, wherein each of the plurality of gate terminals are programmed to:
control a first exit gate such that a first number of vehicles that can exit through the first exit gate is smaller than a second number of vehicles that can exit through a second exit gate.

3. The vehicle exit management system as claimed in claim 2, wherein
the communications apparatus is further configured to:
acquire, from the server apparatus, information of an exit-possible gate that is an exit gate controlled by a gate terminal of the gate terminals, the gate terminal being set to conditions that are satisfied by the stored priority information, and
output the information of the exit-possible gate.

4. A gate terminal that controls an exit gate of a parking lot by carrying out communications with a communications apparatus installed in a vehicle that is in an area corresponding to the exit gate, the gate terminal including a processor that is programmed to execute the following:
set conditions for a vehicle to exit through the exit gate;
receive, from the communications apparatus, priority information that is stored in the communications apparatus, the priority information having been acquired by the communications apparatus based on identification information identifying the vehicle or an occupant of the vehicle, and the priority information indicating one of at least three different priority levels for the vehicle, each priority level having a different level of priority with respect to the other priority levels, the one priority level to be used when exiting through the exit gate;
control the exit gate to open the exit gate when the received priority information that satisfies the set conditions; and
set such conditions that a first number of vehicles that can exit through the exit gate is smaller than a second number of vehicles that can exit through another exit gate.

* * * * *